(12) United States Patent
Naito et al.

(10) Patent No.: US 6,396,681 B2
(45) Date of Patent: May 28, 2002

(54) NONREDUCING DIELECTRIC CERAMIC AND MONOLITHIC CERAMIC CAPACITOR USING THE SAME

(75) Inventors: Masahiro Naito, Shiga-ken; Tomoo Motoki, Izumo; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/827,653

(22) Filed: Apr. 6, 2001

(30) Foreign Application Priority Data

Apr. 7, 2000 (JP) .......................... 2000-106906
Mar. 15, 2001 (JP) .......................... 2001-074810

(51) Int. Cl.$^7$ .......................... H01G 4/06; C04B 35/468
(52) U.S. Cl. .......................... 361/321.4; 361/321.5; 361/320; 361/313; 501/134; 501/136; 501/137; 501/138
(58) Field of Search ........... 361/311–313, 321.2–321.5, 361/320; 501/134–138

(56) References Cited

U.S. PATENT DOCUMENTS 5,019,306 A * 5/1991 Huang et al. ............... 264/332
6,205,015 B1 * 3/2001 Wada et al. ................. 361/313
6,291,380 B1 * 9/2001 Yokoi et al. ............. 361/321.4

FOREIGN PATENT DOCUMENTS

| EP | 0224807 A2 | 6/1987 |
|---|---|---|
| EP | 0913843 A1 | 5/1999 |
| EP | 0978853 A1 | 2/2000 |
| EP | 1036778 A1 | 9/2000 |
| JP | 60-131708 | 7/1985 |
| JP | 63-126117 | 5/1988 |
| JP | 5-9073 | 1/1993 |
| JP | 5-217426 | 8/1993 |
| JP | 10-330163 | 12/1998 |
| JP | 10-335169 | 12/1998 |
| WO | 00/18701 | 4/2000 |

* cited by examiner

*Primary Examiner*—Anthony Dinkins
(74) *Attorney, Agent, or Firm*—Dickstein Shapiro Morin & Oshinsky LLP

(57) ABSTRACT

A nonreducing dielectric contains a main-component having a perovskite crystal phase and satisfying the formula $$(Ca_{1-a-b-c}Sr_aBa_bMg_c)_m(Zr_{1-w-x-y-z}Ti_wMn_xNi_yHf_z)O_3$$

and a compound oxide represented by the formulae (Si, T)O$_2$—MO—XO and (Si, T)O$_2$—(Mn, M')O—Al$_2$O$_3$. The ratio of the intensity of the maximum peak of a crystal phase not of the perovskite crystal phase to the intensity of the maximum peak assigned to the perovskite crystal phase appearing at 2θ=25 to 35° is about 5% or less in a CuKα X-ray diffraction pattern.

20 Claims, 4 Drawing Sheets

NONREDUCING DIELECTRIC CERAMIC AND MONOLITHIC CERAMIC CAPACITOR USING THE SAME

BACKGROUND OF THE INVENTION

1. Field of the Invention

The present invention relates to a nonreducing dielectric ceramic, and a monolithic ceramic capacitor using the same.

2. Description of the Related Art

Japanese Unexamined Patent Application Publication Nos. 60-131708, 63-126117, 5-9073, 5-217426, 10-330163 and 10-335169 disclose $(Ca_{1-x}Sr_x)_m(Zr_{1-y}Ti_y)O_3$-type dielectric ceramic materials as nonreducing dielectric ceramic materials which exhibit excellent dielectric characteristics and do not become semiconductive even when internal electrodes provided therefor are composed of an inexpensive base metal such as nickel (Ni), copper (Cu), etc., and baking is performed in a neutral or reducing atmosphere having low oxygen partial pressure.

By using these dielectric ceramic materials, dielectric ceramics which do not become semiconductive even when baking is performed in a reducing atmosphere can be formed. Moreover, the production of monolithic ceramic capacitors having internal electrodes composed of a base metal such as nickel (Ni) or copper (Cu) has become possible.

However, in the nonreducing dielectric ceramics disclosed in the above-described Japanese Unexamined Patent Application Publication Nos. 60-131708 and 63-126117, raw materials, i.e., calcium carbonate ($CaCO_3$), strontium carbonate ($SrCO_3$), titanium dioxide ($TiO_2$) and zirconium dioxide ($ZrO_2$) are calcined at the same time as manganese dioxide ($MnO_2$), which is a secondary component, and silicon dioxide ($SiO_2$), which is a mineralizer, so as to make a ceramic having a main component satisfying the formula $(Ca_{1-x}Sr_x)_m(Zr_{1-y}Ti_y)O_3$. As a consequence, the resulting calcined material powder has not only peaks characteristic of a perovskite crystal phase which is the primary crystal phase, but also peaks indicating crystal phases not of the perovskite crystal phase. When the dielectric ceramic is formed by sintering one of these calcined material powders in a reducing atmosphere, crystal phases not of the perovskite-structured primary crystal phase (i.e., different phases) remain in the resulting dielectric. When the thickness of an element is reduced to manufacture a miniaturized high-capacitance monolithic ceramic capacitor, the performance thereof in a high-temperature loading lifetime test is degraded since these different crystal phases have inferior thermal resistance.

Japanese Unexamined Patent Application Publication Nos. 63-126117, 5-9073, 5-217426, and 10-330163 disclose nonreducing dielectric ceramics containing lithium (Li) or boron (B) in their additive glasses. Because Li and B readily evaporate at high temperatures, fluctuations in furnace temperature and unevenness of the atmosphere result in fluctuation in the amount of Li or B evaporating and the evaporation time. Thus, the characteristics such as electrostatic capacitance of the resulting capacitors are irregular.

Japanese Unexamined Patent Application Publication No. 10-335169 discloses a nonreducing dielectric ceramic comprising a main component represented by the formula $[(Ca_xSr_{1-x})O]_m[(Ti_yZr_{1-y})O_2]$, manganese oxide, aluminum oxide, and a secondary component represented by the formula $[(Ba_zCa_{1-z})O]_vSiO_2$. The nonreducing dielectric ceramic does not contain components which readily evaporate during baking. Consequently, the ceramics show greater reliability in a high-temperature loading lifetime test and exhibit less irregularity in performance. The nonreducing dielectric ceramic indeed shows some improvement in insulation-resistance in a high-temperature loading lifetime test but has a significant proportion of crystal phases which are not of the perovskite primary crystal phase. As a result, degradation of insulation-resistance is observed in a moisture-resistance loading test.

Recently, the demand for smaller monolithic ceramic capacitors having large capacitance has required thin yet highly reliable dielectric ceramic layers. In order to meet this need, a highly reliable dielectric ceramic material capable of forming thinner layers and a small, yet highly reliable, monolithic ceramic capacitor having large capacitance at high temperatures and high humidity is desired.

SUMMARY OF THE INVENTION

Accordingly, it is an object of the present invention to provide a nonreducing dielectric ceramic including a main component having a perovskite crystal phase, the main component satisfying the formula

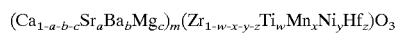

$(Ca_{1-a-b-c}Sr_aBa_bMg_c)_m(Zr_{1-w-x-y-z}Ti_wMn_xNi_yHf_z)O_3$ wherein $0 \leq a<0.5$, $0 \leq b<0.5$, $0 \leq c<0.05$, $0 \leq a+b+c<0.5$, $0.98 \leq m<1.03$, $0 \leq w<0.6$, $0 \leq x<0.05$, $0 \leq y<0.05$, $0 \leq z<0.3$, $0 \leq x+y \leq 0.05$, and $0 \leq w+x+y+z<0.6$ and at least one type of compound oxide selected from one of the group consisting of (Si, T)$O_2$—MO—XO wherein T is at least one element selected from Ti and Zr, MO is at least one selected from MnO and NiO, and XO is at least one selected from BaO, SrO, CaO and MgO and (Si, T)$O_2$—(Mn, M')O—$Al_2O_3$ wherein T is at least one of Ti and Zr, and M' is at least one selected from Ni, Ba, Sr, Ca and Mg. The proportion of the intensity of the maximum peak of a crystal phase not of the perovskite crystal phase to the intensity of the maximum peak assigned to the perovskite crystal phase appearing at $2\theta = 25$ to $35°$ is about 5% or less in a CuKα X-ray diffraction pattern.

Preferably, the compound oxide (Si, T)$O_2$—MO—XO represented by the formula $\alpha(Si_{1-\mu-\nu}Ti_\mu Zr_\nu)O_2$—$\beta(Mn_{1-\xi}Ni_\xi)O$—$\gamma XO$, wherein α, β and γ are molar percent and XO is at least one of BaO, SrO, CaO and MgO satisfies the relationships $0 \leq \mu<0.5$, $0 \leq \nu<0.7$, $0 \leq \xi \leq 1.0$, $0 \leq \mu+\nu \leq 0.7$. The $(Si_{1-\mu-\nu}Ti_\mu Zr_\nu)O_2$ content, the $(Mn_{1-\xi}Ni_\xi)O$ content and the XO content in the compound oxide preferably lie within the region surrounded by points A (α=25.0, β=75.0, γ=0), B(α=100.0, β=0, γ=0), C (α=20.0, β=0, γ=80.0), and D (α=5.0, β=15.0, γ=80.0) including the lines AB, AD, and DC, and excluding the line BC is used as the compound oxide in a ternary diagram.

Preferably, the compound oxide (Si, T)$O_2$—(Mn, M')O—$Al_2O_3$ represented by the formula $\alpha(Si_{1-\mu}T_\mu)O_2$—$\beta(Mn_{1-\nu}M'_\nu)O$—$\gamma Al_2O_3$ wherein α, β, and γ are molar percent, T is at least one of Ti and Zr, and M' is at least one of Ni, Ba, Sr, Ca and Mg, satisfies the relationships $0 \leq \mu<0.5$ and $0 \leq \nu<0.5$. The $(Si_{1-\mu}T_\mu)O_2$ content, the $(Mn_{1-\nu}M'_\nu)O$ content and the $Al_2O_3$ content in the compound oxide preferably lie within the region surrounded by points A (α=80.0, β=20.0, γ=0), B(α=10.0, β=90.0, γ=0), C (α=10.0, β=20.0, γ=70.0), D (α=30.0, β=0, γ=70.0), and E (α=80.0, β=0, γ=20.0) including the lines AE, BC and CD and excluding the lines AB and ED in a ternary diagram.

The present invention also provides a monolithic ceramic capacitor including a plurality of dielectric ceramic layers, internal electrodes provided between the plurality of dielectric ceramic layers and external electrodes electrically connected to the internal electrodes. Each of the plurality of dielectric ceramic layers is formed of the above-described nonreducing dielectric ceramic in accordance with the present invention. The internal electrodes are formed of a base metal as the main component.

The monolithic ceramic capacitor may be provided with plating layers on the surfaces of the external electrodes.

The base metal is preferably one selected from the group consisting of Ni, a Ni alloy, Cu and a Cu alloy.

The nonreducing dielectric ceramic in accordance with the present invention exhibits a high specific resistance of $10^{13}$ Ω·cm or more and a low dielectric loss of 0.1% or less. The rate of change in electrostatic capacitance is within −1000 ppm/° C. The performance thereof in a high-temperature loading lifetime test and moisture-resistance loading test is highly reliable. Moreover, irregularities in the characteristics thereof are reduced since substances which evaporate during sintering are not contained therein.

By using the nonreducing dielectric ceramic of the present invention, the production of monolithic ceramic capacitors having internal electrodes composed of an inexpensive base metal becomes possible. As the base metal, not only elemental nickel and a Ni alloy but also elemental copper and a Cu alloy having a superior high-frequency performance can be used to manufacture small high-performance monolithic ceramic capacitors.

The nonreducing dielectric ceramic of the present invention can be applied to temperature-compensating capacitors and microwave dielectric resonators. It can also be used as the material for small-size high-capacitance monolithic ceramic capacitors since the layers formed therefrom are thin. The scope of the industrial application is significantly wide.

DESCRIPTION OF THE PREFERRED EMBODIMENTS

Figure 1:
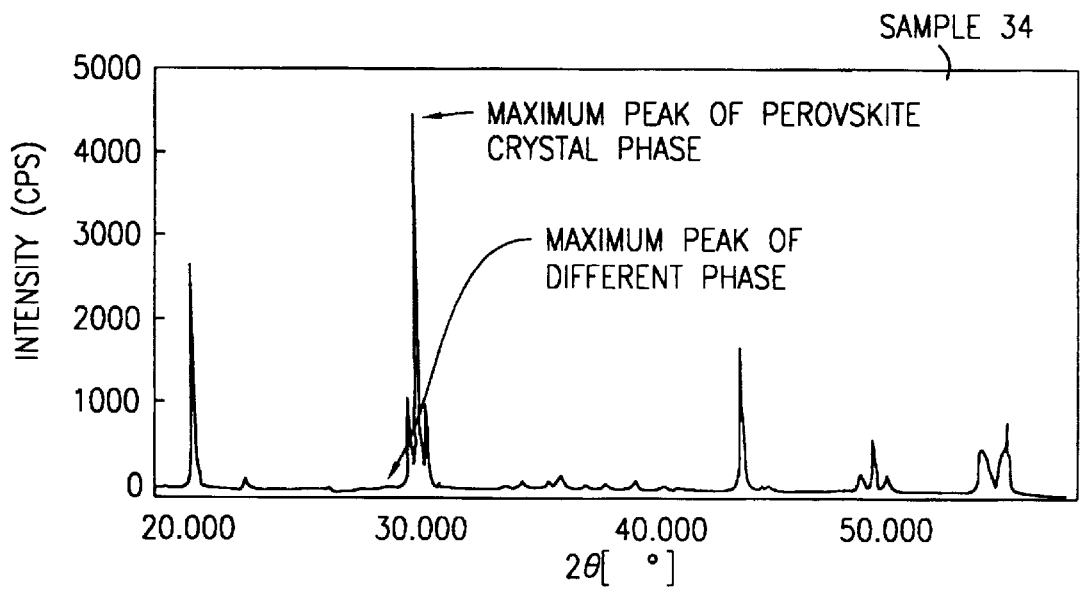
FIG. 1 is a diagram showing the X-ray diffraction pattern of a dielectric ceramic Sample 34.

Now, preferred embodiments of the present invention will be described below by way of Examples.

EXAMPLE 1

First, powders of $CaCo_3$, $SrCO_3$, $BaCO_3$, $MgCO_3$, $ZrO_2$, $TiO_2$, $MnCO_3$, NiO, $HfO_2$ and $SiO_2$, each having purity of 99% or more, were prepared as the raw materials for the main component of a nonreducing dielectric ceramic and for a compound oxide added thereto.

These material powders were weighed in order to make uncalcined main-component material powders represented by the formula $$(Ca_{1-a-b-c}Sr_a Ba_b Mg_c)_k(Zr_{1-w-x-y-z}Ti_w Mn_x Ni_y Hf_z)O_3$$

wherein subscripts a, b, c, w, x, y and z are as shown in Tables 1 and 2 and subscript k is as shown in Tables 3 and 4. In Tables 3 and 4, the sample numbers correspond to the sample numbers in Tables 1 and 2.

TABLE 1

| Sample No. | Composition of Main-component $(Ca_{1-a-b-c}Sr_a Ba_b Mg_c)_k(Zr_{1-w-x-y-z}Ti_w Mn_x Ni_y Hf_z)O_3$ | | | | | | | | Composition of Compound Oxide $\alpha(Si_{1-\mu-\nu}Ti_\mu Zr_\nu)O_2$-$\beta(Mn_{1-\xi}Ni_\xi)O$-$\gamma CaO$ | | | | | |
|---|---|---|---|---|---|---|---|---|---|---|---|---|---|---|
| | a | b | c | w | x | y | z | m | α | β | γ | μ | ν | ξ |
| 1  | 0.05 | 0    | 0    | 0.10 | 0.02 | 0.02 | 0.02 | 1.00 | 36.4 | 54.5 | 9.1  | 0.02 | 0.10 | 0.20 |
| 2  | 0.01 | 0.50 | 0    | 0.01 | 0.02 | 0.02 | 0.01 | 1.00 | 36.4 | 54.5 | 9.1  | 0.02 | 0.10 | 0.20 |
| 3  | 0.01 | 0    | 0.05 | 0.01 | 0.02 | 0.02 | 0.01 | 1.02 | 36.4 | 54.5 | 9.1  | 0.02 | 0.10 | 0.20 |
| 4  | 0.01 | 0    | 0    | 0.60 | 0.02 | 0.02 | 0.02 | 1.00 | 36.4 | 54.5 | 9.1  | 0.02 | 0.10 | 0.20 |
| 5  | 0.37 | 0.10 | 0.03 | 0.01 | 0.02 | 0.02 | 0.01 | 1.00 | 36.4 | 54.5 | 9.1  | 0.02 | 0.10 | 0.20 |
| 6  | 0.01 | 0    | 0    | 0.01 | 0.02 | 0.02 | 0.01 | 0.97 | 36.4 | 54.5 | 9.1  | 0.02 | 0.10 | 0.20 |
| 7  | 0.01 | 0    | 0    | 0.01 | 0.02 | 0.02 | 0.01 | 1.03 | 36.4 | 54.5 | 9.1  | 0.02 | 0.10 | 0.20 |
| 8  | 0.01 | 0    | 0    | 0.01 | 0.05 | 0    | 0.01 | 1.00 | 36.4 | 54.5 | 9.1  | 0.02 | 0.10 | 0.20 |
| 9  | 0.01 | 0    | 0    | 0.01 | 0    | 0.05 | 0.01 | 1.00 | 36.4 | 54.5 | 9.1  | 0.02 | 0.10 | 0.20 |
| 10 | 0.01 | 0    | 0    | 0.01 | 0.02 | 0.02 | 0.30 | 1.02 | 36.4 | 54.5 | 9.1  | 0.02 | 0.10 | 0.20 |
| 11 | 0.01 | 0    | 0    | 0.01 | 0.04 | 0.02 | 0.01 | 1.00 | 36.4 | 54.5 | 9.1  | 0.02 | 0.10 | 0.20 |
| 12 | 0.01 | 0    | 0    | 0.55 | 0.02 | 0.02 | 0.01 | 0.99 | 36.4 | 54.5 | 9.1  | 0.02 | 0.10 | 0.20 |
| 13 | 0.01 | 0    | 0    | 0.01 | 0.02 | 0.02 | 0.02 | 1.02 | Li-type glass | | | | | |
| 14 | 0.01 | 0    | 0    | 0.01 | 0.02 | 0.02 | 0.02 | 1.02 | Li-B-type glass | | | | | |
| 15 | 0.01 | 0    | 0    | 0.01 | 0.02 | 0.02 | 0.01 | 1.01 | 36.4 | 54.5 | 9.1  | 0.02 | 0    | 0.20 |
| 16 | 0    | 0    | 0    | 0.37 | 0.01 | 0.02 | 0.02 | 0.99 | 33.3 | 66.7 | 0    | 0.02 | 0.10 | 0.20 |
| 17 | 0.30 | 0.10 | 0.02 | 0.01 | 0.02 | 0.02 | 0.01 | 1.00 | 36.4 | 54.5 | 9.1  | 0.02 | 0.10 | 0.20 |
| 18 | 0.01 | 0    | 0    | 0.01 | 0.01 | 0.02 | 0.02 | 1.00 | 19.7 | 0.3  | 80.0 | 0.02 | 0.10 | 0.20 |
| 19 | 0.01 | 0    | 0    | 0.01 | 0.01 | 0.02 | 0.02 | 1.00 | 5.0  | 15.0 | 80.0 | 0.02 | 0.10 | 0.20 |
| 20 | 0.01 | 0    | 0    | 0.01 | 0.01 | 0.02 | 0.02 | 1.00 | 45.4 | 6.2  | 48.4 | 0.02 | 0.10 | 0.20 |
| 21 | 0.01 | 0    | 0    | 0.37 | 0.02 | 0.02 | 0.02 | 0.99 | 36.4 | 54.5 | 9.1  | 0.02 | 0.10 | 0.20 |
| 22 | 0.30 | 0    | 0    | 0.30 | 0.02 | 0.02 | 0.01 | 1.00 | 36.4 | 54.5 | 9.1  | 0.02 | 0.10 | 0.20 |
| 23 | 0.24 | 0.16 | 0    | 0    | 0.02 | 0.02 | 0.01 | 0.99 | 36.4 | 54.5 | 9.1  | 0.02 | 0.10 | 0.20 |
| 24 | 0.31 | 0    | 0    | 0    | 0    | 0    | 0    | 0.99 | 36.4 | 54.5 | 9.1  | 0.02 | 0.10 | 0.20 |

TABLE 1-continued

| Sample No. | Composition of Main-component $(Ca_{1-a-b-c}Sr_aBa_bMg_c)_k(Zr_{1-w-y-z}Ti_wMn_xNi_yHf_z)O_3$ | | | | | | | | Composition of Compound Oxide $\alpha(Si_{1-\mu-\nu}Ti_\mu Zr_\nu)O_2\text{-}\beta(Mn_{1-\xi}Ni_\xi)O\text{-}\gamma CaO$ | | | | | |
|---|---|---|---|---|---|---|---|---|---|---|---|---|---|---|
| | a | b | c | w | x | y | z | m | α | β | γ | μ | ν | ξ |
| 25 | 0.45 | 0 | 0 | 0.30 | 0.02 | 0.02 | 0.02 | 0.99 | 36.4 | 54.5 | 9.1 | 0.02 | 0.10 | 0.20 |
| 26 | 0.30 | 0.10 | 0.01 | 0.01 | 0.02 | 0.02 | 0.01 | 1.00 | 36.4 | 54.5 | 9.1 | 0.02 | 0.10 | 0.20 |
| 27 | 0.01 | 0 | 0 | 0.37 | 0.04 | 0.01 | 0.01 | 1.02 | 36.4 | 54.5 | 9.1 | 0 | 0 | 0.20 |
| 28 | 0.01 | 0 | 0 | 0.01 | 0.01 | 0.04 | 0.01 | 1.00 | 36.4 | 54.5 | 9.1 | 0.02 | 0.10 | 0.20 |
| 29 | 0.01 | 0 | 0.03 | 0.01 | 0.02 | 0.02 | 0.01 | 1.00 | 36.4 | 54.5 | 9.1 | 0.02 | 0.10 | 0.20 |
| 30 | 0 | 0.45 | 0 | 0.45 | 0.02 | 0.02 | 0.01 | 1.00 | 36.4 | 54.5 | 9.1 | 0.02 | 0.10 | 0.20 |

TABLE 2

| Sample No. | Composition of Main-component $(Ca_{1-a-b-c}Sr_aBa_bMg_c)_k(Zr_{1-w-y-z}Ti_wMn_xNi_yHf_z)O_3$ | | | | | | | | Composition of Compound Oxide $\alpha(Si_{1-\mu-\nu}Ti_\mu Zr_\nu)O_2\text{-}\beta(Mn_{1-\xi}Ni_\xi)O\text{-}\gamma CaO$ | | | | | |
|---|---|---|---|---|---|---|---|---|---|---|---|---|---|---|
| | a | b | c | w | x | y | z | m | α | β | γ | μ | ν | ξ |
| 31 | 0.01 | 0 | 0 | 0.20 | 0.01 | 0.02 | 0.11 | 0.98 | 36.4 | 54.5 | 9.1 | 0.02 | 0.10 | 0.20 |
| 32 | 0.01 | 0 | 0 | 0.01 | 0.01 | 0.02 | 0.02 | 1.00 | 36.4 | 54.5 | 9.1 | 0.02 | 0.10 | 0.20 |
| 33 | 0.01 | 0 | 0 | 0.01 | 0 | 0 | 0.02 | 1.00 | 25.0 | 75.0 | 0 | 0.02 | 0.10 | 0.20 |
| 34 | 0.01 | 0 | 0 | 0.01 | 0.01 | 0.02 | 0.02 | 1.00 | 60.0 | 40.0 | 0 | 0.02 | 0.10 | 0.20 |
| 35 | 0.01 | 0 | 0 | 0.01 | 0.01 | 0.02 | 0.02 | 1.00 | 99.7 | 0.3 | 0 | 0.02 | 0.10 | 0.20 |
| 36 | 0.01 | 0 | 0 | 0.01 | 0.01 | 0.02 | 0.02 | 1.00 | 19.7 | 0.3 | 80.0 | 0.02 | 0.10 | 0.20 |
| 37 | 0.01 | 0 | 0 | 0.01 | 0.01 | 0.02 | 0.02 | 1.00 | 5.0 | 15.0 | 80.0 | 0.02 | 0.10 | 0.20 |
| 38 | 0.01 | 0 | 0 | 0.01 | 0.01 | 0.02 | 0.02 | 1.00 | 45.4 | 6.2 | 48.4 | 0.02 | 0.10 | 0.20 |
| 39 | 0.01 | 0 | 0 | 0.01 | 0.01 | 0.02 | 0.02 | 1.00 | 42.9 | 57.1 | 0 | 0.02 | 0.10 | 0.20 |
| 40 | 0.01 | 0 | 0 | 0.01 | 0.01 | 0.02 | 0.02 | 1.00 | 33.3 | 33.3 | 33.4 | 0.02 | 0.10 | 0.20 |
| 41 | 0.01 | 0 | 0 | 0.01 | 0.01 | 0.02 | 0.02 | 1.00 | 12.0 | 8.0 | 80.0 | 0.02 | 0.10 | 0.20 |
| 42 | 0.01 | 0 | 0 | 0.01 | 0.01 | 0.02 | 0.02 | 1.00 | 9.4 | 28.2 | 62.4 | 0.02 | 0.10 | 0.20 |
| 43 | 0.01 | 0 | 0 | 0.01 | 0.01 | 0.02 | 0.02 | 1.00 | 36.4 | 54.5 | 9.1 | 0.40 | 0.10 | 0.20 |
| 44 | 0.01 | 0 | 0 | 0.01 | 0.01 | 0.02 | 0.02 | 1.00 | 36.4 | 54.5 | 9.1 | 0.02 | 0.10 | 0.50 |
| 45 | 0.01 | 0 | 0 | 0.01 | 0.01 | 0.02 | 0.02 | 1.00 | 36.4 | 54.5 | 9.1 | 0.02 | 0.10 | 1.00 |
| 46 | 0 | 0 | 0 | 0.37 | 0.01 | 0.02 | 0.02 | 0.99 | 33.3 | 66.7 | 0 | 0.02 | 0.10 | 0.20 |
| 47 | 0 | 0 | 0 | 0.37 | 0.01 | 0.02 | 0.02 | 0.98 | 25.0 | 50.0 | 25.0 | 0.02 | 0.10 | 0.20 |
| 48 | 0 | 0 | 0 | 0.37 | 0.01 | 0.02 | 0.02 | 0.98 | 25.0 | 50.0 | 25.0 | 0.04 | 0.10 | 0.30 |
| 49 | 0 | 0 | 0 | 0.37 | 0.01 | 0.02 | 0.02 | 0.98 | 22.2 | 55.6 | 22.2 | 0.02 | 0.10 | 0.20 |
| 50 | 0 | 0 | 0 | 0.37 | 0.01 | 0.02 | 0.02 | 0.98 | 29.9 | 46.7 | 23.4 | 0.02 | 0.10 | 0.20 |
| 51 | 0.01 | 0 | 0 | 0.01 | 0.01 | 0.02 | 0.02 | 1.00 | 24.5 | 75.5 | 0 | 0.02 | 0.10 | 0.20 |
| 52 | 0.01 | 0 | 0 | 0.01 | 0.01 | 0.02 | 0.02 | 1.00 | 16.5 | 3.0 | 80.5 | 0.02 | 0.10 | 0.20 |
| 53 | 0.01 | 0 | 0 | 0.01 | 0.01 | 0.02 | 0.02 | 1.00 | 4.5 | 15.5 | 80.0 | 0.02 | 0.10 | 0.20 |
| 54 | 0.01 | 0 | 0 | 0.01 | 0.01 | 0.02 | 0.02 | 1.02 | 36.4 | 54.5 | 9.1 | 0.50 | 0.10 | 0.20 |
| 55 | 0.01 | 0 | 0 | 0.01 | 0.01 | 0.02 | 0.02 | 1.00 | 36.4 | 54.5 | 9.1 | 0.02 | 0.70 | 0.20 |
| 56 | 0.01 | 0 | 0 | 0.01 | 0.01 | 0.02 | 0.02 | 1.00 | 36.4 | 54.5 | 9.1 | 0.30 | 0.50 | 0.20 |

TABLE 3

| Sample No. | Composition of Main-component $(Ca_{1-a-b-c}Sr_aBa_bMg_c)_k(Zr_{1-w-y-z}Ti_wMn_xNi_yHf_z)O_3$ | | |
|---|---|---|---|
| | k | Average particle diameter after milling and before calcining (μm) | Calcination temperature (° C.) |
| 1 | 1.00 | 0.4 | 1200 |
| 2 | 1.00 | 0.4 | 1200 |
| 3 | 1.00 | 0.4 | 1200 |
| 4 | 0.97 | 0.4 | 1200 |
| 5 | 1.00 | 0.4 | 1200 |
| 6 | 0.97 | 0.3 | 1200 |
| 7 | 0.97 | 0.4 | 1200 |
| 8 | 1.00 | 0.4 | 1200 |
| 9 | 1.00 | 0.4 | 1200 |
| 10 | 1.00 | 0.4 | 1300 |
| 11 | 1.00 | 0.5 | 1200 |
| 12 | 0.97 | 0.5 | 1200 |
| 13 | 1.01 | 0.4 | 1300 |
| 14 | 1.01 | 0.4 | 1300 |
| 15 | 1.01 | 0.5 | 950 |
| 16 | 0.96 | 0.8 | 950 |
| 17 | 1.00 | 0.6 | 1200 |
| 18 | 0.96 | 0.4 | 1000 |
| 19 | 1.00 | 1.0 | 1100 |
| 20 | 0.96 | 0.8 | 950 |
| 21 | 0.97 | 0.3 | 1200 |
| 22 | 1.00 | 0.5 | 1200 |
| 23 | 0.99 | 0.4 | 1200 |
| 24 | 0.99 | 0.5 | 1100 |
| 25 | 0.99 | 0.5 | 1200 |
| 26 | 1.00 | 0.4 | 1200 |
| 27 | 1.00 | 0.5 | 1100 |
| 28 | 1.00 | 0.4 | 1250 |

TABLE 3-continued

Composition of Main-component
$(Ca_{1-a-b-c}Sr_aBa_bMg_c)_k(Zr_{1-w-x-y-z}Ti_wMn_xNi_yHf_z)O_3$

| Sample No. | k | Average particle diameter after milling and before calcining ($\mu$m) | Calcination temperature (° C.) |
|---|---|---|---|
| 29 | 1.00 | 0.4 | 1250 |
| 30 | 1.00 | 0.4 | 1200 |

TABLE 4

Composition of Main-component
$(Ca_{1-a-b-c}Sr_aBa_bMg_c)_k(Zr_{1-w-x-y-z}Ti_wMn_xNi_yHf_z)O_3$

| Sample No. | k | Average particle diameter after milling and before calcining ($\mu$m) | Calcination temperature (° C.) |
|---|---|---|---|
| 31 | 0.98 | 0.4 | 1200 |
| 32 | 0.99 | 0.3 | 1300 |
| 33 | 1.00 | 0.3 | 1300 |
| 34 | 1.00 | 0.3 | 1300 |
| 35 | 1.00 | 0.4 | 1250 |
| 36 | 1.00 | 0.4 | 1250 |
| 37 | 1.00 | 0.5 | 1200 |
| 38 | 1.00 | 0.5 | 1300 |
| 39 | 1.00 | 0.3 | 1300 |
| 40 | 1.00 | 0.3 | 1300 |
| 41 | 0.97 | 0.5 | 1100 |
| 42 | 0.97 | 0.4 | 1200 |
| 43 | 1.00 | 0.3 | 1300 |
| 44 | 1.00 | 0.3 | 1300 |
| 45 | 1.00 | 0.3 | 1300 |
| 46 | 0.99 | 0.3 | 1200 |
| 47 | 0.98 | 0.3 | 1200 |
| 48 | 0.98 | 0.3 | 1200 |
| 49 | 0.98 | 0.3 | 1200 |
| 50 | 0.97 | 0.5 | 1000 |
| 51 | 1.00 | 0.4 | 1200 |
| 52 | 1.00 | 0.4 | 1150 |
| 53 | 1.00 | 0.5 | 1100 |
| 54 | 1.01 | 0.4 | 1200 |
| 55 | 0.97 | 0.4 | 1150 |
| 56 | 0.99 | 0.5 | 1200 |

The uncalcined main-component material powders were wet-blended and pulverized in a ball mill, and were dried. The average particle diameter of the respective main-component material powders is shown in Tables 3 and 4.

Next, the uncalcined main-component material powders were calcined in air at the temperatures shown in Tables 3 and 4 for two hours to obtain calcined main-component material powders.

In order to precisely adjust the proportion of the components in each of the main-component material powders, $CaCO_3$, $SrCO_3$, $BaCO_3$ and $MgCO_3$ were added to the calcined main-component powder so that subscript m in the formula $(Ca_{1-a-b-c}Sr_aBa_bMg_c)_m(Zr_{1-w-x-y-z}Ti_wMn_xNi_yHf_z)O_3$ was that those shown in Tables 1 and 2. A predetermined amount of the compound oxide shown in Tables 1 and 2 was then added to each of the precisely-adjusted main-component material powders. In the material powders Samples 13 and 14, a predetermined amount of Li-type glass and Li—B-type glass were added in place of the compound oxides and were mixed.

$SiO_2$, $TiO_2$, $ZrO_2$, $MnCO_3$, NiO and $CaCO_3$ were weighed in advance, and mixed, calcined and milled to an average diameter of 1 $\mu$m or less to obtain the compound oxides shown in Tables 1 and 2 satisfying the formula $\alpha(Si_{1-\mu-\nu}Ti_\mu Zr_\nu)O_2—\beta(Mn_{1-\xi}Ni_\xi)O—\gamma CaO$, wherein subscripts $\alpha$, $\beta$, and $\gamma$ were molar percent and subscripts $\alpha$, $\beta$, $\gamma$, $\nu$, and $\xi$ were as shown in Tables 1 and 2.

A poly(vinyl butyral)-based binder and an organic solvent such as ethanol were added to the resulting material powders and were wet-blended in a ball mill to obtain ceramic slurries.

Each of the ceramic slurries was formed into sheet by the doctor blade method and was cut to obtain rectangular ceramic green sheets, each having a thickness of 12 $\mu$m.

A conductive paste primarily composed of elemental nickel (Ni) was applied by printing on the ceramic green sheets so as to make conductive paste layers for forming internal electrodes of a monolithic ceramic capacitor.

The ceramic green sheets provided with conductive paste layers thereon were then laminated so that an end face of each ceramic green sheet exposing the conductive paste appeared alternately in the resulting ceramic green sheet laminate.

The laminate was heated to a temperature in the range of 240 to 350° C. in an air or $N_2$ atmosphere to burn out the binder. Subsequently, the laminate was sintered at a temperature shown in Tables 5 and 6 in a reducing atmosphere of $H_2$—$N_2$—$H_2O$ gas to form a ceramic sintered compact. Note that the sample numbers in Tables 5 and 6 correspond to the sample numbers in Tables 1 and 2.

An silver (Ag) paste was applied on the two end faces of the resulting ceramic sintered compact and was baked at 800° C. in air to form external electrodes electrically connected to the internal electrodes.

The outer dimensions of the resulting monolithic ceramic capacitor were 1.6 mm in width, 3.2 mm in length and 1.2 mm in thickness. The thickness of each dielectric ceramic layer was 10 $\mu$m. The total number of the effective dielectric ceramic layers was 50.

Next, the electrical characteristics of the resulting monolithic ceramic capacitor were examined. Electrostatic capacitance and dielectric loss were determined at a frequency of 1 MHZ and a temperature of 25° C. The relative dielectric constant was calculated from the electrostatic capacitance. Subsequently, insulation-resistance was measured by applying a DC voltage of 50 V for two minutes at a temperature of 25° C. and the specific resistance was calculated therefrom. The electrostatic capacitance was further examined at a frequency of 1 MHZ and at temperatures of 25° C. and 125° C. A rate of change (TC) thereof was calculated using the formula (1) described below. In the formula (1), C125 indicates the electrostatic capacitance (pF) at a temperature of 125° C. and C25 indicates the electrostatic capacitance (pF) at a temperature of 25° C.

Formula (1): $TC=\{(C125-C25)/C25\}\times\{1/(125-25)\}\times 10^6$ [ppm/° C.]

Moreover, thirty-six test pieces for each sample were subjected to a high-temperature loading lifetime test. A DC voltage of 200 V was applied to the test pieces at a temperature of 140° C. and the change in insulation-resistance over time was examined. In this test, the life of the sample piece was considered terminated when the insulation-resistance reached $10^6$ $\Omega$ or less. The average lifetime for each sample was calculated.

Seventy-six test pieces for each sample were subjected to a moisture-resistance loading test. A DC voltage of 100 V was applied to the sample pieces at a temperature of 121° C. under air pressure 2 (relative humidity 100%) and the change in insulation-resistance over time was measured. The test pieces were deemed defective if the insulation-resistance thereof reached $10^6$ $\Omega$ or less within 200 hours.

The test pieces of the ceramic sintered compacts were pulverized using a mortar to undergo a CuK$\alpha$ X-ray diffraction analysis in order to obtain an intensity ratio of the maximum peak of a different phase (i.e., every crystal phase which was not the perovskite crystal phase) to the maximum peak characteristic of perovskite crystal phase appearing at 2θ=25 to 35 degrees. It is to be understood that because the internal electrodes were pulverized together with the ceramic sintered compacts, the X-ray diffraction chart has peaks relating to the internal electrodes. These peaks were, accordingly, not different phases of the ceramic and the intensity of these peaks were disregarded for purposes of the comparison.

The results of the above-described examinations are shown in Tables 5 and 6.

TABLE 5

| Sample No. | Baking Temperature (° C.) | Dielectric Loss (%) | Relative Dielectric Constant | Specific Resistance (Ω cm) | TC (ppm/° C.) | Average Lifetime (hr) | No. of Defects in Moisture-resistance Test | Different Phase Intensity Rate |
|---|---|---|---|---|---|---|---|---|
| 1 | 1300 | 0.01 | 45 | >$10^{13}$ | −220 | 5 | 0/72 | 1.5 |
| 2 | 1300 | 0.01 | 36 | >$10^{13}$ | −150 | 75 | 0/72 | 1.0 |
| 3 | 1350 | | | | Not Sintered | | | |
| 4 | 1300 | 0.25 | 120 | >$10^{13}$ | −1050 | 45 | 0/72 | 3.5 |
| 5 | 1300 | 0.22 | 33 | >$10^{13}$ | 18 | 50 | 0/72 | 1.0 |
| 6 | 1250 | 0.40 | 31 | >$10^{13}$ | −10 | 10 | 0/72 | 0.5 |
| 7 | 1350 | | | | Not Sintered | | | |
| 8 | 1250 | 0.60 | 31 | $6 \times 10^{12}$ | 98 | 20 | 0/72 | 2.0 |
| 9 | 1250 | 0.02 | 31 | $4 \times 10^{12}$ | 21 | 65 | 0/72 | 2.0 |
| 10 | 1350 | | | | Not Sintered | | | |
| 11 | 1250 | 0.47 | 31 | $5 \times 10^{12}$ | 78 | 40 | 0/72 | 3.0 |
| 12 | 1300 | 0.01 | 97 | >$10^{13}$ | −1000 | 20 | 0/72 | 3.5 |
| 13 | 1250 | 0.04 | 32 | >$10^{13}$ | 13 | 250 | 1/72 | 3.0 |
| 14 | 1250 | 0.05 | 32 | >$10^{13}$ | 15 | 270 | 6/72 | 3.0 |
| 15 | 1300 | 0.28 | 32 | $3 \times 10^{12}$ | 5 | 95 | 0/72 | 5.5 |
| 16 | 1300 | 0.35 | 84 | $3 \times 10^{12}$ | −940 | 70 | 0/72 | 6.5 |
| 17 | 1300 | 0.49 | 32 | $3 \times 10^{12}$ | 16 | 35 | 0/72 | 6.0 |
| 18 | 1350 | 0.87 | 31 | $3 \times 10^{12}$ | 47 | 45 | 0/72 | 6.0 |
| 19 | 1350 | 0.53 | 32 | $3 \times 10^{12}$ | 53 | 80 | 0/72 | 6.0 |
| 20 | 1300 | 0.43 | 32 | $3 \times 10^{12}$ | 5 | 85 | 0/72 | 6.5 |
| 21 | 1300 | 0.01 | 85 | >$10^{13}$ | −940 | 420 | 0/72 | 1.5 |
| 22 | 1300 | 0.10 | 55 | >$10^{13}$ | −350 | 450 | 0/72 | 2.0 |
| 23 | 1300 | 0.05 | 46 | >$10^{13}$ | 13 | 425 | 0/72 | 1.0 |
| 24 | 1300 | 0.06 | 32 | >$10^{13}$ | −5 | 420 | 0/72 | 3.0 |
| 25 | 1300 | 0.01 | 79 | >$10^{13}$ | −670 | 430 | 0/72 | 2.0 |
| 26 | 1300 | 0.09 | 32 | >$10^{13}$ | 16 | 440 | 0/72 | 1.0 |
| 27 | 1300 | 0.07 | 83 | >$10^{13}$ | −880 | 410 | 0/72 | 4.5 |
| 28 | 1300 | 0.01 | 31 | >$10^{13}$ | 10 | 410 | 0/72 | 1.5 |
| 29 | 1350 | 0.03 | 33 | >$10^{13}$ | 50 | 440 | 0/72 | 2.0 |
| 30 | 1300 | 0.02 | 96 | >$10^{13}$ | −1000 | 420 | 0/72 | 2.5 |

TABLE 6

| Sample No. | Baking Temperature (° C.) | Dielectric Loss (%) | Relative Dielectric Constant | Specific Resistance (Ω cm) | TC (ppm/° C.) | Average Lifetime (hr) | No. of Defects in Moisture-resistance Test | Different Phase Intensity Rate |
|---|---|---|---|---|---|---|---|---|
| 31 | 1300 | 0.01 | 57 | >$10^{13}$ | −490 | 440 | 0/72 | 1.0 |
| 32 | 1300 | 0.01 | 32 | >$10^{13}$ | 4 | >500 | 0/72 | 0.5 |
| 33 | 1300 | 0.02 | 33 | >$10^{13}$ | −5 | 480 | 0/72 | 1.0 |
| 34 | 1300 | 0.03 | 32 | >$10^{13}$ | −2 | >500 | 0/72 | 1.0 |
| 35 | 1300 | 0.03 | 30 | >$10^{13}$ | 28 | 405 | 0/72 | 2.5 |
| 36 | 1350 | 0.08 | 31 | >$10^{13}$ | 47 | 420 | 0/72 | 3.0 |
| 37 | 1350 | 0.08 | 32 | >$10^{13}$ | 53 | 420 | 0/72 | 4.0 |
| 38 | 1350 | 0.01 | 32 | >$10^{13}$ | 5 | >500 | 0/72 | 4.0 |
| 39 | 1300 | 0.01 | 32 | >$10^{13}$ | 2 | >500 | 0/72 | 1.0 |
| 40 | 1350 | 0.01 | 28 | >$10^{13}$ | −5 | >500 | 0/72 | 1.0 |
| 41 | 1350 | 0.07 | 31 | >$10^{13}$ | 23 | >500 | 0/72 | 4.0 |
| 42 | 1350 | 0.09 | 32 | >$10^{13}$ | 28 | 460 | 0/72 | 3.0 |
| 43 | 1350 | 0.02 | 32 | >$10^{13}$ | 5 | 490 | 0/72 | 0.5 |
| 44 | 1300 | 0.01 | 32 | >$10^{13}$ | 5 | 440 | 0/72 | 0.5 |
| 45 | 1300 | 0.01 | 32 | >$10^{13}$ | 5 | 420 | 0/72 | 0.5 |
| 46 | 1300 | 0.01 | 85 | >$10^{13}$ | −940 | 460 | 0/72 | 0.5 |
| 47 | 1350 | 0.02 | 83 | >$10^{13}$ | −820 | 440 | 0/72 | 1.5 |
| 48 | 1350 | 0.02 | 83 | >$10^{13}$ | −950 | 480 | 0/72 | 1.5 |
| 49 | 1300 | 0.06 | 84 | >$10^{13}$ | −790 | 460 | 0/72 | 2.0 |
| 50 | 1350 | 0.01 | 83 | >$10^{13}$ | −860 | 460 | 0/72 | 3.0 |
| 51 | 1300 | 0.09 | 33 | >$10^{13}$ | −2 | 325 | 0/72 | 1.0 |
| 52 | 1350 | 0.08 | 29 | >$10^{13}$ | 5 | 310 | 0/72 | 4.5 |
| 53 | 1350 | 0.07 | 31 | >$10^{13}$ | 48 | 340 | 0/72 | 4.5 |
| 54 | 1350 | 0.04 | 32 | >$10^{13}$ | 2 | 360 | 0/72 | 1.0 |

TABLE 6-continued

| Sample No. | Baking Temperature (° C.) | Dielectric Loss (%) | Relative Dielectric Constant | Specific Resistance (Ω cm) | TC (ppm/° C.) | Average Lifetime (hr) | No. of Defects in Moisture-resistance Test | Different Phase Intensity Rate |
|---|---|---|---|---|---|---|---|---|
| 55 | 1350 | 0.02 | 30 | >$10^{13}$ | −21 | 380 | 0/72 | 4.5 |
| 56 | 1350 | 0.03 | 31 | >$10^{13}$ | −10 | 360 | 0/72 | 3.0 |

As apparent from Tables 5 and 6, the nonreducing dielectric ceramics Samples 21 to 56 exhibited high specific resistances of $10^{13}$ Ω·cm or more and low dielectric losses of 0.1% or less. The rate of the change in electrostatic capacitance relative to temperature did not exceed −1000 ppm/° C. and this value may be adjusted to a desired value by changing the composition. The average lifetime in a high-temperature loading lifetime test at 150° C. and 200 V was significantly long and was 300 hours or more. Defects did not occur in the moisture-resistance loading test at 121° C./air pressure 2/100 V even after 200 hours had passed.

EXAMPLE 2

A monolithic ceramic capacitor containing a compound oxide and containing Li-type glass were manufactured to examine particle diameter and breakdown-voltage.

More specifically, the same material powders as in Example 1 were weighed to prepare an uncalcined main-component material powder represented by the formula $(Ca_{1-a-b-c}Sr_aBa_bMg_c)_k(Zr_{1-w-x-y-z}Ti_wMn_xNi_yHf_z)O_3$ wherein subscripts a, b, c, w, x, y, and z are as shown in Table 7 and subscript k is as shown in Table 8. In Table 7, the sample numbers correspond to the sample numbers in Table 8.

was shown in Table 7. A predetermined amount of the compound oxide shown in Table 7 was then added to the material powder Sample 61. In the material powder Sample 62, a predetermined amount of Li-type glass was added in place of the compound oxide.

The same raw materials as in Example 1 were weighed in advance, and mixed, calcined and milled to the same average diameter as in Example 1 and to obtain the compound oxide shown in Table 7 satisfying the formula $\alpha(Si_{1-\mu-\nu}Ti_\mu Zr_\nu)O_2$—$\beta(Mn_{1-\xi}Ni_\xi)O$—$\gamma CaO$, wherein subscripts α, β, and were molar percent and subscripts α, β, γ, μ, ν, and ξ were as shown in Table 7.

Ceramic slurries were formed as in Example 1 from the material powders and rectangular ceramic green sheets having a thickness of 12 μm were formed from the ceramic slurries. A conductive paste mainly composed of nickel (Ni) as in Example 1 was applied on these ceramic green sheets by printing to form conductive paste layers for forming internal electrodes of monolithic ceramic capacitors. The ceramic green sheets were laminated as in Example 1 to

TABLE 7

| Sample No. | Composition of Main-component $(Ca_{1-a-b-c}Sr_aBa_bMg_c)_m(Zr_{1-w-x-y-z}Ti_wMn_xNi_yHf_z)O_3$ | | | | | | | | Composition of Compound Oxide $\alpha(Si_{1-\mu-\nu}Ti_\mu Zr_\nu)O_2$-$\beta(Mn_{1-\xi}Ni_\xi)O$-$\gamma CaO$ | | | | | |
|---|---|---|---|---|---|---|---|---|---|---|---|---|---|---|
| | a | b | c | w | x | y | z | m | α | β | γ | μ | ν | ξ |
| 61 | 0.01 | 0 | 0 | 0.01 | 0.01 | 0.02 | 0.02 | 1.00 | 36.4 | 54.5 | 9.1 | 0.02 | 0.10 | 0.20 |
| 62 | 0.01 | 0 | 0 | 0.01 | 0.01 | 0.02 | 0.02 | 1.00 | Li-type glass | | | | | |

TABLE 8

| | Composition of Main-component $(Ca_{1-a-b-c}Sr_aBa_bMg_c)_m(Zr_{1-w-x-y-z}Ti_wMn_xNi_yHf_z)O_3$ | | |
|---|---|---|---|
| Sample No. | k | Average Diameter after Milling before Calcining | Calcination Temperature (° C.) |
| 61 | 0.99 | 0.3 | 1300 |
| 62 | 0.99 | 0.3 | 1300 |

The above-described uncalcined main-component material powders were wet-blended and pulverized in a ball mill, and were dried. The average particle diameter of the main-component material powders is shown in Table 8. Next, the uncalcined main-component material powders were calcined at the temperatures shown in Table 8 in air for two hours to form calcined main-component material powders.

$CaCO_3$, $SrCO_3$, $BaCO_3$ and $MgCO_3$ were added to each of the calcined main-component powders so that subscript m in the formula

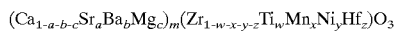

obtain a ceramic green sheet laminates. After burning out the binder contained in the laminates as in Example 1, the laminates were baked in a reducing atmosphere at the temperatures shown in Table 9 to form sintered ceramic compacts. The sample numbers in Table 9 correspond to the sample numbers in Table 7.

External electrodes were formed as in Example 1 on the two end faces of each of the sintered ceramic compacts.

The outer dimensions of the resulting monolithic ceramic capacitors were 1.6 mm in width, 0.8 mm in length, and 0.7 mm in thickness. The thickness of the dielectric ceramic layer was 10 μm. The total number of the effective dielectric ceramic layers was 30.

Next, the particle diameter of monolithic ceramic capacitors, thirty for each sample, was measured by scanning electron microscopy (SEM). Breakdown-voltage was examined to calculate standard deviation.

The results are shown in Table 9.

TABLE 9

| Sample No. | No. of Test Pieces | Baking Temperature (° C.) | Compound Oxide or Glass added | SEM Particle Diameter (μm) | Breakdown-voltage (V) Upper: Average Lower: Standard deviation |
|---|---|---|---|---|---|
| 61 | 30 | 1300 | Si-Mn-Ca-type compound oxide | 1.0–3.0 | 1520 52 |
| 62 | 30 | 1300 | Li-type glass | 1.0–10.0 | 1450 145 |

As is apparent from Table 9, there were small variation in the diameters of the nonreducing dielectric ceramic Sample 61 after sintering and a little fluctuation in breakdown-voltage.

It is to be understood that although CaO was used as XO in the compound oxide represented by the formula $\alpha(Si_{1-\mu-v}Ti_\mu Zr_v)O_2 - \beta(Mn_{1-\xi}Ni_\xi)O - \gamma XO$, the scope of the invention is not limited by this example. Any one of BaO, SrO and MgO may be used as XO and the same advantages and effects can still be obtained as in this example.

Moreover, although elemental nickel was used as the base metal constituting the internal electrodes, a nickel alloy, copper (Cu) or a copper alloy may be used in place of elemental nickel. The same advantages and effects obtained in this example can still be achieved.

The ranges of the composition of the nonreducing dielectric ceramic and the composition of the additional compound oxide are limited as below.

The composition of the main-component (100 molar) satisfies the formula: $(Ca_{1-a-b-c}Sr_a Ba_b Mg_c)_m(Zr_{1-w-x-y-z}Ti_w Mn_x Ni_y Hf_z)O_3$ wherein $0 \leq a < 0.5$, $0 \leq b < 0.5$, $0 \leq c < 0.05$, $0 \leq a+b+c < 0.5$, $0.98 \leq m < 1.03$, $0 \leq w < 0.6$, $0 \leq x < 0.05$, $0 \leq y < 0.05$, $0 \leq z < 0.3$, $0 \leq x+y \leq 0.05$, and $0 \leq w+x+y+z < 0.6$. When subscripts a and b are more than 0.5, respectively, as in the dielectric ceramics Samples 1 and 2 in Tables 1 and 5, the average lifetime in high-temperature loading lifetime test is shortened. When subscript c is 0.05 or more as in the dielectric ceramic Sample 3, sinterability is drastically degraded. When subscripts a, b, and c are in the ranges of $0 \leq a < 0.5$, $0 \leq b < 0.5$, and $0 \leq c < 0.05$ but total of a, b, and c is 0.5 or more as in Sample 5, dielectric loss is increased, thereby shortening the average lifetime in the high-temperature loading lifetime test. When subscript w is 0.6 or more as in the dielectric ceramic Sample 4, dielectric loss and rate of change in electrostatic capacitance relative to temperature (TC) are increased and the average lifetime in the high-temperature loading lifetime test is shortened. When subscript x is 0.05 or more as in the dielectric ceramic Sample 8, dielectric loss is increased and an average lifetime in the high-temperature loading lifetime test is decreased. When subscript y is 0.05 or more as in the dielectric ceramic Sample 9, the average lifetime in the high-temperature loading lifetime test is shortened. When subscript z is 0.3 or more as in the dielectric ceramic Sample 10, sinterability is degraded drastically. When the total of subscripts x and y exceeds 0.05 as in the dielectric ceramic Sample 11, dielectric loss is increased and an average lifetime in the high-temperature loading lifetime test is shortened. When the total of subscripts w, x, y, and z is 0.6 or more as in the dielectric ceramic Sample 12, an average lifetime in the high-temperature loading lifetime test is shortened.

In view of the above, the Sr content a is preferably in the range of $0 \leq a < 0.5$, the Ba content b is preferably in the range of $0 \leq b < 0.5$ and the Mg content c is preferably in the range of $0 \leq c < 0.05$. Meanwhile, the sum of a, b, and c is preferably in the range of $0 \leq a+b+c < 0.5$. The Ti content w is preferably in the range of $0 \leq w < 0.6$, the Mn content x is preferably in the range of $0 \leq x < 0.05$, the Ni content y is preferably in the range of $0 \leq y < 0.05$ and Hf content z is preferably in the range of $0 \leq z < 0.3$. Meanwhile, the sum of x and y is preferably in the range of $0 \leq x+y \leq 0.05$ and the sum of w, x, y, and z is preferably in the range of $0 \leq w+x+y+z < 0.6$.

As in the dielectric ceramic Sample 6 in Tables 1 and 5, when subscript m is less than 0.98, dielectric loss is increased and the average lifetime in the high-temperature loading lifetime test is shortened. When subscript m is 1.03 or more as in the dielectric ceramic Sample 7, sinterability is degraded drastically. Subscript m is, therefore, preferably in the range of $0.98 \leq m < 1.03$.

When glass containing volatile components such as Li or B is used in place of the additional compound oxide, the volatilization amount and the volatilization time vary between samples. As a consequence, some particles exhibit abnormal growth while others exhibit no growth resulting in irregular particle diameters. Accordingly, even when the main-component of the nonreducing dielectric ceramic satisfies the above-described ranges, the number of defective pieces in moisture-resistance loading test increases as in the dielectric ceramics Samples 13 and 14 in Table 1 and if the compound oxide added thereto contained Li-type glass or Li—B type glass. Also, as in the dielectric ceramic Sample 62 in Table 7 and 9, fluctuation in breakdown-voltage is increased, thereby degrading the reliability.

In view of the above, the additional compound oxide is preferably a compound oxide containing neither Li-type nor Li—B type glass which satisfies the formula $(Si, T)O_2$—MO—XO wherein T is at least one selected from the group consisting of Ti and Zr, MO is at least one selected from the group consisting of MnO and NiO, and XO is at least one selected from the group BaO, SrO, CaO and MgO.

When the intensity ratio of the maximum peak of the different phase (i.e., every crystal phase not the perovskite crystal phase) to the maximum peak characteristic of perovskite crystal phase appearing at 2θ=25 to 35 degrees exceeds about 5% in the CuKα X-ray diffraction analysis, dielectric loss is undesirably increased and the average lifetime in the high-temperature loading lifetime test is undesirably shortened as demonstrated by the dielectric ceramics Samples 15 to 20 in Table 5. Accordingly, the intensity ratio of the maximum peak of the different phase relative to the maximum peak of the perovskite crystal phase is preferably about 5% or less and more preferably about 3% or less.

As is apparent from the dielectric ceramics Samples 15 to 20 in Tables 1, 3 and 5, the following factors must be satisfied in addition to satisfying the above-described composition ranges of the main-component and complying with the types of the compound oxide in order to prevent the intensity ratio of the maximum phase of the different phase to the maximum peak of the perovskite crystal phase from exceeding about 5%. First, an average particle diameter of the main-component material is about 0.5 μm or less after milling and before calcining. Second, an A/B site ratio in the main-component material is in the range of about 0.97 to 1.01 before calcining. Third, a calcination temperature is in the range of about 1000 to 1300° C.

Figure 2:
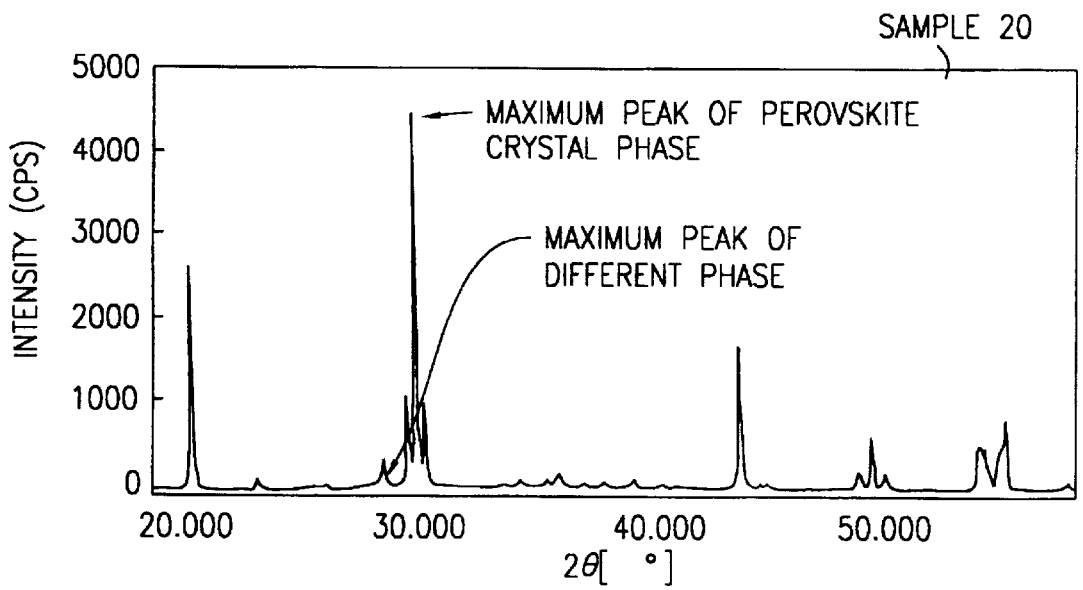
FIG. 2 is a diagram showing the X-ray diffraction pattern of a dielectric ceramic Sample 20.

FIG. 1 is an X-ray diffraction diagram of the dielectric ceramic Sample 34 in which the intensity ratio of the maximum peak of the different peak relative to the maximum peak of the perovskite crystal phase is 1.0%. FIG. 2 is an X-ray diffraction diagram of the dielectric ceramic Sample 20 having the intensity ratio of 6.5%. The asterisked peaks in the charts indicate peaks indicating the perovskite crystal phase. The peaks not indicating the perovskite crystal phase are not asterisked.

Figure 3:
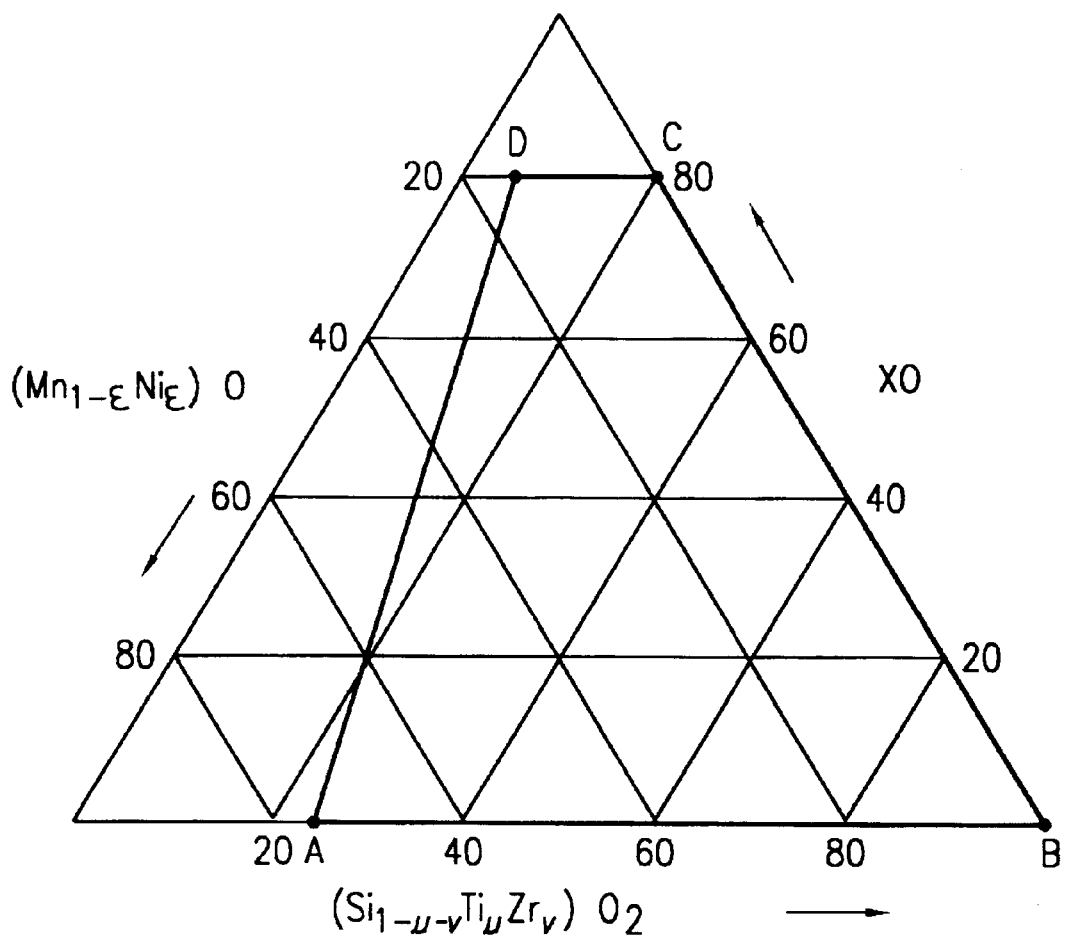
FIG. 3 is a ternary diagram of showing the $(Si_{1-\mu-\nu}Ti_\mu Zr_\nu)O_2$ content, the $(Mn_{1-\xi}Ni_\xi)O$ content and the XO content in a $(Si, T)O_2$—MO—XO-type compound oxide.

Preferably, a compound oxide represented by the formula $$\alpha(Si_{1-\mu-\nu}Ti_\mu Zr_\nu)O_2 - \beta(Mn_{1-\xi}Ni_\xi)O - \gamma XO$$

where (a, b, and g are molar percent and XO is one selected from the group consisting of BaO, SrO, CaO, and MgO), wherein $0 \leq \mu < 0.5$, $0 \leq \nu < 0.7$, $0 \leq \xi \leq 1.0$, $0 \leq \mu+\nu \leq 0.7$ and wherein the $(Si_{1-\mu-\nu}Ti_\mu Zr_\nu)O_2$ content, the $(Mn_{1-\xi}Ni_\xi)O$ content and the XO content lie within the region in the ternary diagram in FIG. 3 surrounded by points A ($\alpha$=25.0, $\beta$=75.0, $\gamma$=0), B($\alpha$=100.0, $\beta$=0, $\gamma$=0), C ($\alpha$=20.0, $\beta$=0, $\gamma$=80.0), and D ($\alpha$=5.0, $\beta$=15.0, $\gamma$=80.0) including the lines AB, AD, and DC but excluding the line BC is used as the compound oxide. By using such an oxide, significantly long lifetime of 400 hours or more in the high-temperature loading lifetime test can be achieved as shown by the dielectric ceramics Samples 21 to 50 in Tables 1, 2, 5, and 6.

EXAMPLE 3

Nonreducing dielectric ceramics having the same main-component as Example 1 added with the compound oxides of different compositions were formed.

First, powders of $CaCO_3$, $SrCO_3$, $BaCO_3$, $MgCO_3$, $ZrO_2$, $TiO_2$, $MnCO_3$, NiO, $HfO_2$, $SiO_2$ and $Al_2O_3$, each having purity of 99% or more, were prepared as the raw materials for the main-component and for the compound oxide.

These material powders were weighed to obtain an uncalcined main-component material powder represented by the formula $(Ca_{1-a-b-c}Sr_a Ba_b Mg_c)_k(Zr_{1-w-x-y-z}Ti_w Mn_x Ni_y Hf_z)O_3$ wherein subscripts a, b, c, w, x, y, and z were as shown in Tables 10 and 11 and subscript k was as shown in Tables 12 and 13. In Tables 12 and 13, the sample numbers correspond to the sample numbers in Tables 10 and 11.

TABLE 10

| Sample No. | Composition of Main-component $(Ca_{1-a-b-c}Sr_a Ba_b Mg_c)_m(Zr_{1-w-x-y-z}Ti_w Mn_x Ni_y Hf_z)O_3$ | | | | | | | | Composition of Compound Oxide $\alpha(Si_{1-\mu}Ti_\mu)O_2 - \beta(Mn_{1-\nu}Sr_\nu)O - \gamma Al_2O_3$ | | | | |
|---|---|---|---|---|---|---|---|---|---|---|---|---|---|
| | a | b | c | w | x | y | z | m | $\alpha$ | $\beta$ | $\gamma$ | $\mu$ | $\nu$ |
| 101 | 0.50 | 0 | 0 | 0.20 | 0.02 | 0.02 | 0.01 | 1.00 | 51.6 | 36.3 | 12.1 | 0.20 | 0.10 |
| 102 | 0.01 | 0.50 | 0 | 0.05 | 0.02 | 0.02 | 0.01 | 1.00 | 51.6 | 36.3 | 12.1 | 0.20 | 0.10 |
| 103 | 0.01 | 0 | 0.05 | 0.01 | 0.02 | 0.02 | 0.02 | 1.02 | 51.6 | 36.3 | 12.1 | 0.20 | 0.10 |
| 104 | 0.37 | 0.10 | 0.03 | 0.03 | 0.02 | 0.02 | 0.01 | 1.00 | 51.6 | 36.3 | 12.1 | 0.20 | 0.10 |
| 105 | 0.01 | 0 | 0 | 0.60 | 0.02 | 0.02 | 0.01 | 1.00 | 51.6 | 36.3 | 12.1 | 0.20 | 0.10 |
| 106 | 0.01 | 0 | 0 | 0.01 | 0.05 | 0 | 0.01 | 1.00 | 51.6 | 36.3 | 12.1 | 0.20 | 0.10 |
| 107 | 0.01 | 0 | 0 | 0.01 | 0 | 0.05 | 0.02 | 1.00 | 51.6 | 36.3 | 12.1 | 0.20 | 0.10 |
| 108 | 0.01 | 0 | 0 | 0.01 | 0.02 | 0.02 | 0.30 | 1.02 | 51.6 | 36.3 | 12.1 | 0.20 | 0.10 |
| 109 | 0.01 | 0 | 0 | 0.01 | 0.04 | 0.02 | 0.01 | 1.00 | 51.6 | 36.3 | 12.1 | 0.20 | 0.10 |
| 110 | 0.01 | 0 | 0 | 0.55 | 0.02 | 0.02 | 0.01 | 1.00 | 51.6 | 36.3 | 12.1 | 0.20 | 0.10 |
| 111 | 0.01 | 0 | 0 | 0.01 | 0.02 | 0.02 | 0.01 | 0.97 | 51.6 | 36.3 | 12.1 | 0.20 | 0.10 |
| 112 | 0.01 | 0 | 0 | 0.01 | 0.02 | 0.02 | 0.02 | 1.03 | 51.6 | 36.3 | 12.1 | 0.20 | 0.10 |
| 113 | 0.01 | 0 | 0 | 0.01 | 0.01 | 0.02 | 0.02 | 1.00 | Li-type glass | | | | |
| 114 | 0.01 | 0 | 0 | 0.01 | 0.01 | 0.02 | 0.02 | 1.00 | Li-B-type glass | | | | |
| 115 | 0.01 | 0 | 0 | 0.01 | 0.01 | 0.02 | 0.01 | 1.00 | 51.6 | 36.3 | 12.1 | 0.20 | 0.10 |
| 116 | 0.01 | 0 | 0 | 0.01 | 0.01 | 0.02 | 0.02 | 1.00 | 0 | 60.0 | 40.0 | — | 0.10 |
| 117 | 0.01 | 0 | 0 | 0.01 | 0.01 | 0.02 | 0.02 | 1.00 | 60.0 | 0 | 40.0 | 0.20 | — |
| 118 | 0.01 | 0 | 0 | 0.01 | 0.01 | 0.02 | 0.02 | 1.00 | 25.0 | 75.0 | 0 | 0.20 | 0.10 |
| 119 | 0.01 | 0 | 0 | 0.01 | 0.01 | 0.02 | 0.01 | 1.01 | 78.0 | 19.0 | 3.0 | 0.20 | 0.10 |
| 120 | 0 | 0 | 0 | 0.37 | 0.01 | 0.02 | 0.01 | 1.01 | 51.6 | 36.3 | 12.1 | 0.20 | 0.10 |
| 121 | 0.01 | 0 | 0 | 0.01 | 0.01 | 0.02 | 0.01 | 1.00 | 51.6 | 36.3 | 12.1 | 0.20 | 0.10 |
| 122 | 0 | 0 | 0 | 0.33 | 0.01 | 0.02 | 0.01 | 0.99 | 51.6 | 36.3 | 12.1 | 0.20 | 0.10 |
| 123 | 0 | 0 | 0 | 0.33 | 0.01 | 0.02 | 0.01 | 0.99 | 51.6 | 36.3 | 12.1 | 0.20 | 0.10 |
| 124 | 0 | 0 | 0 | 0.37 | 0.01 | 0.02 | 0.01 | 0.99 | 51.6 | 36.3 | 12.1 | 0.20 | 0.10 |
| 125 | 0.25 | 0 | 0 | 0.25 | 0.01 | 0.02 | 0.01 | 1.01 | 51.6 | 36.3 | 12.1 | 0.20 | 0.10 |
| 126 | 0.25 | 0 | 0 | 0.25 | 0.01 | 0.02 | 0.01 | 1.01 | 51.6 | 36.3 | 12.1 | 0.20 | 0.10 |
| 127 | 0 | 0.25 | 0 | 0.25 | 0.01 | 0.02 | 0.01 | 1.00 | 51.6 | 36.3 | 12.1 | 0.20 | 0.10 |
| 128 | 0 | 0.25 | 0 | 0.25 | 0.01 | 0.02 | 0.01 | 1.00 | 51.6 | 36.3 | 12.1 | 0.20 | 0.10 |
| 129 | 0.31 | 0 | 0 | 0.03 | 0.01 | 0.02 | 0.01 | 1.00 | 51.6 | 36.3 | 12.1 | 0.20 | 0.10 |
| 130 | 0.31 | 0 | 0 | 0.03 | 0.01 | 0.02 | 0.01 | 1.00 | 51.6 | 36.3 | 12.1 | 0.20 | 0.10 |

TABLE 11

| Sample No. | Composition of Main-component $(Ca_{1-a-b-c}Sr_a Ba_b Mg_c)_m(Zr_{1-w-x-y-z}Ti_w Mn_x Ni_y Hf_z)O_3$ | | | | | | | | Composition of Compound Oxide $\alpha(Si_{1-\mu}Ti_\mu)O_2 - \beta(Mn_{1-\nu}Sr_\nu)O - \gamma Al_2O_3$ | | | | |
|---|---|---|---|---|---|---|---|---|---|---|---|---|---|
| | a | b | c | w | x | y | z | m | $\alpha$ | $\beta$ | $\gamma$ | $\mu$ | $\nu$ |
| 131 | 0.01 | 0 | 0 | 0.01 | 0.01 | 0.02 | 0.02 | 1.01 | 32.8 | 58.4 | 8.8 | 0.20 | 0.10 |
| 132 | 0.01 | 0 | 0 | 0.01 | 0.01 | 0.02 | 0.02 | 1.01 | 32.8 | 58.4 | 8.8 | 0.20 | 0.10 |
| 133 | 0.01 | 0 | 0 | 0.01 | 0.01 | 0.02 | 0.02 | 1.01 | 43.3 | 48.0 | 8.7 | 0.20 | 0.10 |

TABLE 11-continued

| Sample No. | Composition of Main-component $(Ca_{1-a-b-c}Sr_aBa_bMg_c)_m(Zr_{1-w-x-y-z}Ti_wMn_xNi_yHf_z)O_3$ | | | | | | | | Composition of Compound Oxide $\alpha(Si_{1-\mu}Ti_\mu)O_2-\beta(Mn_{1-v}Sr_v)O-\gamma Al_2O_3$ | | | | |
|---|---|---|---|---|---|---|---|---|---|---|---|---|---|
| | a | b | c | w | x | y | z | m | α | β | γ | μ | v |
| 134 | 0.01 | 0 | 0 | 0.01 | 0.01 | 0.02 | 0.02 | 1.01 | 44.1 | 29.4 | 26.5 | 0.20 | 0.10 |
| 135 | 0.01 | 0 | 0 | 0.01 | 0.01 | 0.02 | 0.02 | 1.01 | 64.0 | 18.9 | 17.1 | 0.20 | 0.10 |
| 136 | 0.01 | 0 | 0 | 0.01 | 0.01 | 0.02 | 0.02 | 1.00 | 81.0 | 10.0 | 9.0 | 0.20 | 0.10 |
| 137 | 0.01 | 0 | 0 | 0.01 | 0.01 | 0.02 | 0.02 | 1.00 | 80.0 | 10.0 | 10.0 | 0.20 | 0.10 |
| 138 | 0.01 | 0 | 0 | 0.01 | 0.01 | 0.02 | 0.02 | 1.00 | 80.0 | 1.0 | 19.0 | 0.20 | 0.10 |
| 139 | 0.01 | 0 | 0 | 0.01 | 0.01 | 0.02 | 0.02 | 1.00 | 80.0 | 19.0 | 1.0 | 0.20 | 0.10 |
| 140 | 0.01 | 0 | 0 | 0.01 | 0.01 | 0.02 | 0.02 | 1.00 | 9.5 | 50.0 | 40.5 | 0.20 | 0.10 |
| 141 | 0.01 | 0 | 0 | 0.01 | 0.01 | 0.02 | 0.02 | 1.00 | 10.0 | 50.0 | 40.0 | 0.20 | 0.10 |
| 142 | 0.01 | 0 | 0 | 0.01 | 0.01 | 0.02 | 0.02 | 1.00 | 10.0 | 89.5 | 0.5 | 0.20 | 0.10 |
| 143 | 0.01 | 0 | 0 | 0.01 | 0.01 | 0.02 | 0.02 | 1.00 | 10.0 | 20.0 | 70.0 | 0.20 | 0.10 |
| 144 | 0.01 | 0 | 0 | 0.01 | 0.01 | 0.02 | 0.02 | 1.00 | 19.0 | 10.0 | 71.0 | 0.20 | 0.10 |
| 145 | 0.01 | 0 | 0 | 0.01 | 0.01 | 0.02 | 0.02 | 1.00 | 20.0 | 10.0 | 70.0 | 0.02 | 0.10 |
| 146 | 0.01 | 0 | 0 | 0.01 | 0.01 | 0.02 | 0.02 | 1.00 | 29.5 | 0.5 | 70.0 | 0.20 | 0.10 |
| 147 | 0.01 | 0 | 0 | 0.01 | 0.01 | 0.02 | 0.02 | 1.00 | 68.1 | 24.0 | 7.9 | 0.20 | 0.10 |
| 148 | 0.01 | 0 | 0 | 0.01 | 0.01 | 0.02 | 0.02 | 1.00 | 35.5 | 56.2 | 8.3 | 0.20 | 0.60 |

TABLE 12

| Sample No. | Composition of Main-component $(Ca_{1-a-b-c}Sr_aBa_bMg_c)_m(Zr_{1-w-x-y-z}Ti_wMn_xNi_yHf_z)O_3$ | | |
|---|---|---|---|
| | k | Average particle diameter after milling and before calcining (μm) | Calcination temperature (° C.) |
| 101 | 1.00 | 0.4 | 1200 |
| 102 | 1.00 | 0.3 | 1200 |
| 103 | 1.00 | 0.4 | 1200 |
| 104 | 1.00 | 0.4 | 1200 |
| 105 | 0.97 | 0.5 | 1200 |
| 106 | 1.00 | 0.4 | 1200 |
| 107 | 1.00 | 0.4 | 1200 |
| 108 | 1.00 | 0.4 | 1300 |
| 109 | 1.00 | 0.4 | 1200 |
| 110 | 1.00 | 0.4 | 1200 |
| 111 | 0.97 | 0.3 | 1200 |
| 112 | 0.97 | 0.4 | 1200 |
| 113 | 1.00 | 0.5 | 1300 |
| 114 | 1.00 | 0.5 | 1300 |
| 115 | 1.00 | 0.4 | 1300 |
| 116 | 1.00 | 0.4 | 1300 |
| 117 | 1.00 | 0.3 | 1300 |
| 118 | 1.00 | 0.4 | 1300 |
| 119 | 0.96 | 0.5 | 1100 |
| 120 | 1.01 | 0.7 | 950 |
| 121 | 1.00 | 0.3 | 1300 |
| 122 | 0.99 | 0.3 | 1200 |
| 123 | 0.99 | 0.6 | 1050 |
| 124 | 0.99 | 0.3 | 1200 |
| 125 | 1.00 | 0.3 | 1200 |
| 126 | 0.96 | 0.6 | 1000 |
| 127 | 1.00 | 0.3 | 1200 |
| 128 | 0.95 | 1.0 | 950 |
| 129 | 1.00 | 0.3 | 1200 |
| 130 | 0.99 | 0.5 | 950 |

TABLE 13

| Sample No. | Composition of Main-component $(Ca_{1-a-b-c}Sr_aBa_bMg_c)_m(Zr_{1-w-x-y-z}Ti_wMn_xNi_yHf_z)O_3$ | | |
|---|---|---|---|
| | k | Average particle diameter after milling and before calcining (μm) | Calcination temperature (° C.) |
| 131 | 1.00 | 0.4 | 1300 |
| 132 | 1.00 | 0.6 | 950 |
| 133 | 1.00 | 0.3 | 1300 |
| 134 | 1.00 | 0.4 | 1250 |
| 135 | 1.00 | 0.4 | 1200 |
| 136 | 1.00 | 0.5 | 1100 |
| 137 | 1.00 | 0.5 | 1150 |
| 138 | 0.97 | 0.4 | 1200 |
| 139 | 1.00 | 0.3 | 1300 |
| 140 | 1.00 | 0.3 | 1300 |
| 141 | 1.00 | 0.3 | 1300 |
| 142 | 1.00 | 0.4 | 1300 |
| 143 | 1.00 | 0.5 | 1100 |
| 144 | 1.00 | 0.5 | 1150 |
| 145 | 1.00 | 0.5 | 1150 |
| 146 | 1.00 | 0.3 | 1200 |
| 147 | 1.00 | 0.4 | 1250 |
| 148 | 0.97 | 0.3 | 1200 |

The uncalcined main-component material powders were wet-blended and pulverized in a ball mill, and were dried as in Example 1. The average particle diameters of the main-component material powders are shown in Tables 12 and 13.

Next, the uncalcined main-component material powders were calcined in air at the temperatures shown in Tables 3 and 4 for two hours to obtain calcined main-component material powders.

$CaCO_3$, $SrCO_3$, $BaCO_3$ and $MgCO_3$ were then weighed and were added to the calcined main-component powder so that subscript m in the formula $(Ca_{1-a-b-c}Sr_aBa_bMg_c)_m(Zr_{1-w-x-y-z}Ti_wMn_xNi_yHf_z)O_3$ was as shown in Tables 10 and 11. A predetermined amount of compound oxide shown in Tables 10 and 11 was then added to the main-component material powder. A predetermined amount of Li-type glass was added to the material powder Sample 113 in place of the above-described compound oxide. A predetermined amount of Li—B-type glass was added to the material powder Sample 114. Predetermined amounts of uncalcined Si oxide, Mn oxide and Al oxide were added and mixed to the material powder Sample 115.

$SiO_2$, $TiO_2$, $MnCO_3$, $SrCO_3$ and $Al_2O_3$ were weighed in advance, and mixed, calcined, and milled to an average diameter of 1 μm or less and to obtain the compound oxides shown in Tables 10 and 11 satisfying the formula $a(Si_{1-\mu}Ti_{\mu})O_2$—$\beta(Mn_{1-v}Sr_v)O$—$\gamma Al_2O_3$, wherein subscripts a, b and g were molar percent and subscripts a, b, g, m and n were as shown in Tables 10 and 11.

Ceramic slurries were formed by wet-blending the resulting material powders as in Example 1, were formed into sheets, and were cut to obtain the ceramic green sheets having the same thickness and shape as in Example 1.

A conductive paste primarily composed of nickel (Ni) was applied by printing on the ceramic green sheets so as to form conductive paste layers for forming internal electrodes of monolithic ceramic capacitors as in Example 1. Plural ceramic green sheets were laminated to form ceramic green sheet laminates.

After the laminate was fired to burn out the binder contained therein as in Example 1, the laminate was baked at a temperature shown in Tables 14 and 15 in a reducing atmosphere to form a ceramic sintered compact. Note that the sample numbers in Tables 14 and 15 correspond to the sample numbers in Table 10 and 11.

External electrodes electrically connected with the internal electrodes were formed on the ceramic sintered compact as in Example 1.

A Ni plating solution composed of nickel sulfate, nickel chloride and boric acid was prepared and Ni plating layers were formed on the surfaces of the external electrodes by barrel plating.

On the resulting Ni plating layers, Sn plating layers were formed using a carboxylic-acid-based Sn plating solution by barrel plating.

The outer dimensions of the resulting monolithic ceramic capacitor were 1.6 mm in width, 3.2 mm in length and 1.2 mm in thickness. The thickness of each dielectric ceramic layer was 10 μm. The total number of the effective dielectric ceramic layers was 50.

Next, electrical characteristics of the monolithic ceramic capacitor were examined under the same condition as those of Example 1. That is, electrostatic capacitance and dielectric loss were determined and relative dielectric constant was calculated from the electrostatic capacitance obtained. Subsequently, insulation-resistance was measured and the specific resistance was calculated therefrom. The electrostatic capacitance was further examined and a rate of change (TC) thereof was calculated as in Example 1.

Moreover, thirty-six test pieces for each sample were subjected to a high-temperature loading life test as in Example 1 to examine change in insulation-resistance over time. The lifetimes of the sample pieces were determined using the same standard as in Example 1 and an average lifetime for each sample was determined.

A moisture-resistance loading test was also conducted as in Example 1 to observe the change in insulation-resistance over time. The test pieces considered defective using the same standard as in Example 1 were counted.

These ceramic sintered compacts underwent a CuKα X-ray diffraction analysis to obtain an intensity ratio of the maximum peaks. The results are shown in Tables 14 and 15.

TABLE 14

| Sample No. | Baking Temperature (° C.) | Dielectric Loss (%) | Relative Dielectric Constant | Specific Resistance (Ω cm) | TC (ppm/° C.) | Average Lifetime (hr) | No. of Defects in Moisture-resistance Test | Different Phase Intensity Rate |
|---|---|---|---|---|---|---|---|---|
| 101 | 1200 | 0.01 | 62 | >$10^{13}$ | −420 | 75 | 0/72 | 2.0 |
| 102 | 1250 | 0.01 | 26 | >$10^{13}$ | −150 | 90 | 0/72 | 1.0 |
| 103 | 1350 | | | Not Sintered | | | | |
| 104 | 1250 | 0.22 | 34 | >$10^{13}$ | 37 | 50 | 0/72 | 1.5 |
| 105 | 1200 | 0.08 | 110 | >$10^{13}$ | −1100 | 45 | 0/72 | 3.5 |
| 106 | 1250 | 0.45 | 30 | $6 \times 10^{12}$ | 90 | 35 | 0/72 | 1.5 |
| 107 | 1250 | 0.02 | 30 | $4 \times 10^{12}$ | 18 | 85 | 0/72 | 1.5 |
| 108 | 1350 | | | Not Sintered | | | | |
| 109 | 1250 | 0.38 | 30 | $6 \times 10^{12}$ | 72 | 60 | 0/72 | 2.5 |
| 110 | 1200 | 0.03 | 94 | >$10^{13}$ | −980 | 50 | 0/72 | 3.0 |
| 111 | 1250 | 0.40 | 30 | >$10^{13}$ | −8 | 35 | 0/72 | 0.5 |
| 112 | 1350 | | | Not Sintered | | | | |
| 113 | 1250 | 0.04 | 32 | >$10^{13}$ | 13 | 250 | 1/72 | 3.0 |
| 114 | 1250 | 0.05 | 32 | >$10^{13}$ | 15 | 270 | 6/72 | 3.0 |
| 115 | 1350 | 0.02 | 32 | >$10^{13}$ | −5 | 300 | 1/72 | 1.5 |
| 116 | 1350 | | | Not Sintered | | | | |
| 117 | 1350 | 0.05 | 29 | >$10^{13}$ | −7 | 320 | 2/72 | 2.5 |
| 118 | 1300 | 0.01 | 32 | >$10^{13}$ | 5 | 380 | 1/72 | 1.5 |
| 119 | 1350 | 0.47 | 32 | >$10^{13}$ | −5 | 80 | 0/72 | 5.5 |
| 120 | 1200 | 0.53 | 81 | >$10^{13}$ | −960 | 85 | 0/72 | 6.5 |
| 121 | 1250 | 0.01 | 30 | >$10^{13}$ | −10 | >500 | 0/72 | 0.5 |
| 122 | 1250 | 0.01 | 70 | >$10^{13}$ | −740 | 480 | 0/72 | 0.5 |
| 123 | 1250 | 0.17 | 66 | >$10^{13}$ | −780 | 100 | 0/72 | 6.0 |
| 124 | 1250 | 0.01 | 81 | >$10^{13}$ | −940 | 470 | 0/72 | 0.5 |
| 125 | 1250 | 0.01 | 72 | >$10^{13}$ | −720 | 420 | 0/72 | 0.5 |
| 126 | 1250 | 0.13 | 69 | >$10^{13}$ | −760 | 75 | 0/72 | 6.5 |
| 127 | 1250 | 0.01 | 63 | >$10^{13}$ | −440 | 430 | 0/72 | 0.5 |
| 128 | 1250 | 0.25 | 60 | >$10^{13}$ | −460 | 90 | 0/72 | 8.5 |
| 129 | 1250 | 0.01 | 35 | >$10^{13}$ | −20 | 440 | 0/72 | 0.5 |
| 130 | 1250 | 0.15 | 33 | >$10^{13}$ | −5 | 120 | 0/72 | 6.0 |

TABLE 15

| Sample No. | Baking Temperature (° C.) | Dielectric Loss (%) | Relative Dielectric Constant | Specific Resistance (Ω cm) | TC (ppm/° C.) | Average Lifetime (hr) | No. of Defects in Moisture-resistance Test | Different Phase Intensity Ratio |
|---|---|---|---|---|---|---|---|---|
| 131 | 1250 | 0.01 | 31 | >$10^{13}$ | 3 | 480 | 0/72 | 1.0 |
| 132 | 1250 | 0.12 | 29 | >$10^{13}$ | 16 | 160 | 0/72 | 5.5 |
| 133 | 1250 | 0.01 | 31 | >$10^{13}$ | -2 | >500 | 0/72 | 0.5 |
| 134 | 1250 | 0.01 | 29 | >$10^{13}$ | -12 | 440 | 0/72 | 2.0 |
| 135 | 1250 | 0.01 | 30 | >$10^{13}$ | -15 | 440 | 0/72 | 3.0 |
| 136 | 1300 | 0.04 | 31 | >$10^{13}$ | 8 | 280 | 0/72 | 4.0 |
| 137 | 1300 | 0.03 | 31 | >$10^{13}$ | 6 | 420 | 0/72 | 3.5 |
| 138 | 1350 | 0.06 | 30 | >$10^{13}$ | 9 | 400 | 0/72 | 4.5 |
| 139 | 1300 | 0.01 | 31 | >$10^{13}$ | -5 | 430 | 0/72 | 1.5 |
| 140 | 1250 | 0.07 | 29 | >$10^{13}$ | 12 | 260 | 0/72 | 2.5 |
| 141 | 1200 | 0.07 | 29 | >$10^{13}$ | 11 | 440 | 0/72 | 2.5 |
| 142 | 1250 | 0.09 | 31 | >$10^{13}$ | 17 | 400 | 0/72 | 3.0 |
| 143 | 1250 | 0.01 | 28 | >$10^{13}$ | 6 | 480 | 0/72 | 4.0 |
| 144 | 1250 | 0.03 | 28 | >$10^{13}$ | -2 | 290 | 0/72 | 3.5 |
| 145 | 1250 | 0.02 | 28 | >$10^{13}$ | -4 | 420 | 0/72 | 3.5 |
| 146 | 1250 | 0.05 | 28 | >$10^{13}$ | -11 | 400 | 0/72 | 3.5 |
| 147 | 1200 | 0.01 | 34 | >$10^{13}$ | -21 | 320 | 0/72 | 1.0 |
| 148 | 1250 | 0.02 | 31 | >$10^{13}$ | -10 | 380 | 0/72 | 1.0 |

As is apparent from Tables 14 and 15, the nonreducing dielectric ceramics Samples 121, 122, 124, 125, 127, 129, 131 and 133 to 148 exhibited high specific resistances of 1013 Ω·cm or more and low dielectric losses of 0.1% or less. The rate of change in electrostatic capacitance relative to temperature was within −1000 ppm/° C. This rate can be adjusted to a desired value by changing the composition. The average lifetime in the high-temperature loading lifetime test at 150° C./200 V was significantly long, i.e., 200 hours or more. No defective pieces were found after 200 hours in the moisture-resistance loading test at 121° C./air pressure 2/100 V.

EXAMPLE 4

A monolithic ceramic capacitor containing compound oxide and that containing Li-type glass were formed to examine the fluctuation in particle diameter and in breakdown-voltage.

The same raw materials as in Example 1 were used. These materials were weighed to obtain an uncalcined main-component material powder represented by the formula $(Ca_{1-a-b-c}Sr_aBa_bMg_c)_m(Zr_{1-w-x-y-z}Ti_wMn_xNi_yHf_z)O_3$ wherein subscripts a, b, c, w, x, y, and z are as shown in Table 16 and subscript k is as shown in Table 17. The sample numbers in Table 17 correspond to the sample numbers in Table 16.

TABLE 16

| Sample No. | Composition of Main-component $(Ca_{1-a-b-c}Sr_aBa_bMg_c)_m(Zr_{1-w-x-y-z}Ti_wMn_xNi_yHf_z)O_3$ | | | | | | | | Composition of Compound Oxide $\alpha(Si_{1-\mu}Ti_\mu)O_2$-$\beta(Mn_{1-\nu}Sr_\nu)O$-$\gamma Al_2O_3$ | | | | |
|---|---|---|---|---|---|---|---|---|---|---|---|---|---|
| | a | b | c | w | x | y | z | m | α | β | γ | μ | ν |
| 151 | 0.01 | 0 | 0 | 0.01 | 0.01 | 0.02 | 0.02 | 1.00 | 51.6 | 36.3 | 12.1 | 0.20 | 0.10 |
| 152 | 0.01 | 0 | 0 | 0.01 | 0.01 | 0.02 | 0.02 | 1.00 | Li-type glass | | | | |

TABLE 17

| Sample No. | k | Composition of Main-component $(Ca_{1-a-b-c}Sr_aBa_bMg_c)_m(Zr_{1-w-y-z}Ti_wMn_xNi_yHf_z)O_3$ | |
|---|---|---|---|
| | | Average Particle Diameter after Milling before Calcining (μm) | Calcination Temperature (° C.) |
| 151 | 0.99 | 0.3 | 1300 |
| 152 | 0.99 | 0.3 | 1300 |

The uncalcined main-component material powders were then wet-blended and pulverized in a ball mill, and were dried. An average particle diameter of the main-component material powder at this stage was as shown in Table 17.

The material powder for main-component was calcined for two hours in air at a temperature shown in Table 17 to form calcined material powder for main-component.

In order to precisely adjust the proportion of the components contained in the powder, $CaCO_3$, $SrCO_3$, $BaCO_3$ and $MgCO_3$ were added so that subscript m in the formula $(Ca_{1-a-b-c}Sr_aBa_bMg_c)_m(Zr_{1-w-x-y-z}Ti_wMn_xNi_yHf_z)O_3$ was as shown in Table 16. A predetermined amount of compound oxide shown in Table 16 is added to the material powder Sample 151 and Li-type glass was added in place of the compound oxide to the material powder Sample 152.

The same raw materials as in Example 3 were weighed in advance, and mixed, calcined and milled to the same average diameter as in Example 3 so as to obtain the compound oxides shown in Table 16 satisfying the formula $\alpha(Si_{1-\mu}Ti_\mu)O_2$—$\beta(Mn_{1-\nu}Sr_\nu)O$—$\gamma Al_2O_3$, wherein subscripts α, β, and γ were molar percent and subscripts α, β, γ, μ, and ν were as shown in Table 16.

Ceramic slurries were made using the material powders as in Example 3. Rectangular ceramic green sheets having a thickness of 12 μm were then made from these ceramic slurries. A conductive paste primarily composed of nickel (Ni) was applied by printing on the ceramic green sheets so as to obtain conductive paste layers for forming internal electrodes of a monolithic ceramic capacitor. These ceramic green sheets were laminated as in Example 3 to form a ceramic green sheet laminate. The laminate was heated to burn out the binder and was then baked at a temperature shown in Table 18 in a reducing atmosphere to obtain a ceramic sintered compact. The sample numbers in Table 18 correspond to the sample numbers in Table 16.

External electrodes for providing electrical connecting to the internal electrodes were formed on the ceramic sintered compact as in Example 3. Ni plating layers and then Sn plating layers were formed on the surfaces of the external electrodes as in Example 3.

The outline dimension of the resulting monolithic ceramic capacitor was 1.6 mm in width, 3.2 mm in length and 1.2 mm in thickness. The thickness of each dielectric ceramic layer was 10 μm. The total number of the effective dielectric ceramic layers was 80.

Next, the particle diameter of monolithic ceramic capacitors, thirty for each sample, was measured by a scanning electron microscope (SEM). Breakdown-voltage was also measured and standard deviation was determined. The results are shown in Table 18 below.

TABLE 18

| Sample No. | No. of Test Pieces | Baking Temperature (° C.) | Compound Oxide or Glass added | SEM Particle diameter (μm) | Breakdown-voltage (V) Upper: Average Lower: Standard Deviation |
|---|---|---|---|---|---|
| 151 | 30 | 1230 | Si-Mn-Al-type compound oxide | 0.7–1.0 | 1776 73 |
| 152 | 30 | 1300 | Li-type glass | 1.0–10.0 | 1450 145 |

As is apparent from Table 18, the nonreducing dielectric ceramic Sample 151 containing compound oxide exhibited little variation in the particle diameter after baking and in-breakdown-voltage.

It is to be understood that although Ti was used as T and Sr was used as M' in the compound oxide represented by the formula $\alpha(Si_{1-\mu}T_\mu)O_2$—$\beta(Mn_{1-\nu}M'_\nu)O$—$\gamma Al_2O_3$ in this Example, the scope of the present invention is not limited to this compound oxide. Alternatively, T may be Zr and M' may be one selected from the group consisting of Ni, Ba, Ca and Mg may be used and the same advantages and effects can still be obtained as in this example.

Moreover, although elemental nickel was used as the base metal constituting the internal electrodes, a nickel alloy, copper (Cu) or a copper alloy may be used in place of elemental nickel. The same advantages and effects can still be obtained as in this example.

The ranges of the composition in the nonreducing dielectric ceramic and the composition of the additional compound oxide were limited as below.

In the main-component (100 molar) represented by the formula $(Ca_{1-a-b-c}Sr_aBa_bMg_c)_m(Zr_{1-w-x-y-z}Ti_wMn_xNi_yHf_z)O_3$ wherein $0 \leq a < 0.5$, $0 \leq b < 0.5$, $0 \leq c < 0.05$, $0 \leq a+b+c < 0.5$, $0.98 \leq m < 1.03$, $0 \leq w < 0.06$, $0 \leq x < 0.05$, $0 \leq y < 0.05$, $0 \leq z < 0.3$, $0 \leq x+y \leq 0.05$, and $0 \leq w+x+y+z < 0.6$, when subscripts a and b are more than 0.5, respectively, as in the dielectric ceramics Samples 101 and 102 in Tables 10 and 14, the average lifetime in high-temperature loading lifetime test is shortened. When subscript c is 0.05 or more as in Sample 103, sinterability is significantly degraded. When $0 \leq a < 0.5$, $0 \leq b < 0.5$, and $0 \leq c < 0.05$ but total of a, b, and c is 0.5 or more as in Sample 104, dielectric loss is increased resulting in a shorter average lifetime in the high-temperature loading lifetime test. When subscript w is 0.6 or more as in the dielectric ceramic Sample 105, dielectric loss and rate of change in electrostatic capacitance relative to temperature (TC) are increased and the average lifetime in the high-temperature loading lifetime test is shortened. When subscript x is 0.05 or more as in the dielectric ceramic Sample 106, dielectric loss is increased and the average lifetime in the high-temperature loading lifetime test is decreased. When subscript y is 0.05 or more as in the dielectric ceramic Sample 107, the average lifetime in the high-temperature loading lifetime test is shortened. When subscript z is 0.3 or more as in the dielectric ceramic Sample 108, sinterability thereof is degraded drastically. When the total of subscripts x and y exceeded 0.05 as in the dielectric ceramic Sample 109, dielectric loss is increased and the average lifetime in the high-temperature loading lifetime test is shortened. When the total of subscripts w, x, y, and z is 0.6 or more as in the dielectric ceramic Sample 110, the average lifetime in the high-temperature loading test is shortened.

In view of the above, the Sr content a is preferably in the range of $0 \leq a < 0.5$, the Ba content b is preferably in the range of $0 \leq b < 0.5$ and the Mg content c is preferably in the range of $0 \leq c < 0.05$. Meanwhile, the total of a, b, and c is preferably in the range of 0≦a+b+c<0.5. The Ti content w is preferably in the range of 0≦w<0.6, the Mn content x is preferably in the range of 0≦x<0.05, the Ni content y is preferably in the range of 0≦y<0.05 and Hf content z is preferably in the range of 0≦z<0.3. Meanwhile, the total of x and y is preferably in the range of 0≦x+y≦0.05 and the total of w, x, y, and z is preferably in the range of 0≦w+x+y+z<0.6.

As in the dielectric ceramic Sample 111 in Tables 10 and 14, when subscript m is less than 0.98, dielectric loss is increased and the average lifetime in the high-temperature loading lifetime test is shortened. When subscript m is 1.03 or more as in the dielectric ceramic Sample 112, sinterability is degraded significantly. Subscript m is, therefore, preferably in the range of 0.98≦m<1.03.

When glass containing volatile components such as Li or B is used as the additional compound oxide, the volatilization volume and the volatilization timing varied with Samples. As a consequence, some particles exhibited abnormal growth while others exhibited no growth at all, causing increased fluctuation of particle diameter. Accordingly, when the main-component of the nonreducing dielectric ceramic complies with the above-described ranges but the additional compound oxide contained Li-type glass or Li—B type glass, the number of defective pieces in moisture-resistance loading test increased as in the dielectric ceramics Samples 113 and 114 in Table 10 and 14. Also, as in the dielectric ceramic Sample 152 in Table 16 and 18, fluctuation in breakdown-voltage was increased, thereby degrading the reliability.

When the Si oxide, Mn oxide and Al oxide added to the powder are not calcined in advance as in the nonreducing dielectric ceramic Sample 115 in Tables 10 and 14, sinterability is degraded and the number of defective pieces in the moisture-resistance loading test is increased. When the compound oxide is not provided with all of Si oxide, Mn oxide, and Al oxide, as in the nonreducing dielectric ceramic Samples 116 to 118, sinterability is degraded and the number of defective pieces in the moisture-resistance loading test is increased.

In view of the above, the additional compound oxide is preferably the type of compound oxide containing neither Li-type nor Li—B type glass which satisfies the formula (Si, T)$O_2$—(Mn, M')O—$Al_2O_3$ wherein T is at least one selected from the group consisting of Ti and Zr, M' is at least one selected from the group consisting of Ni, Ba, Sr, Ca and Mg.

When the intensity ratio the maximum peak of a different phase ("different phase" refers to every crystal phase which is not the perovskite crystal phase) to the maximum peak characteristic of perovskite crystal phase appearing at 2θ=25 to 35 degrees exceeds about 5% in the CuKα X-ray diffraction analysis, dielectric loss is undesirably increased and the average lifetime in the high-temperature loading lifetime test is undesirably shortened as shown by the dielectric ceramics Samples 119, 120, 123, 126, 128 and 130 in Table 14 and Sample 132 in Table 15. The intensity of the maximum peak of the different phase relative to the maximum peak of the perovskite crystal phase is preferably about 5% or less.

As is apparent from the dielectric ceramics Samples 119, 120, 123, 126, 128, and 130 in Table 10, 12 and 14 and Sample 132 in Tables 11, 13 and 15, the following factors must be satisfied in addition to satisfying the above-described composition ranges of the main-component and complying with the types of the compound oxide, in order to prevent the intensity of the maximum phase of the different phase to the maximum peak of the perovskite crystal phase from exceeding about 5%. First, an average particle diameter of the main-component material is about 0.5 μm or less after milling and before calcining. Second, an A/B site ratio in the main-component material is in the range of about 0.97 to 1.01 before calcining. Third, a calcination temperature is in the range of about 1000 to 1300° C.

Figure 4:
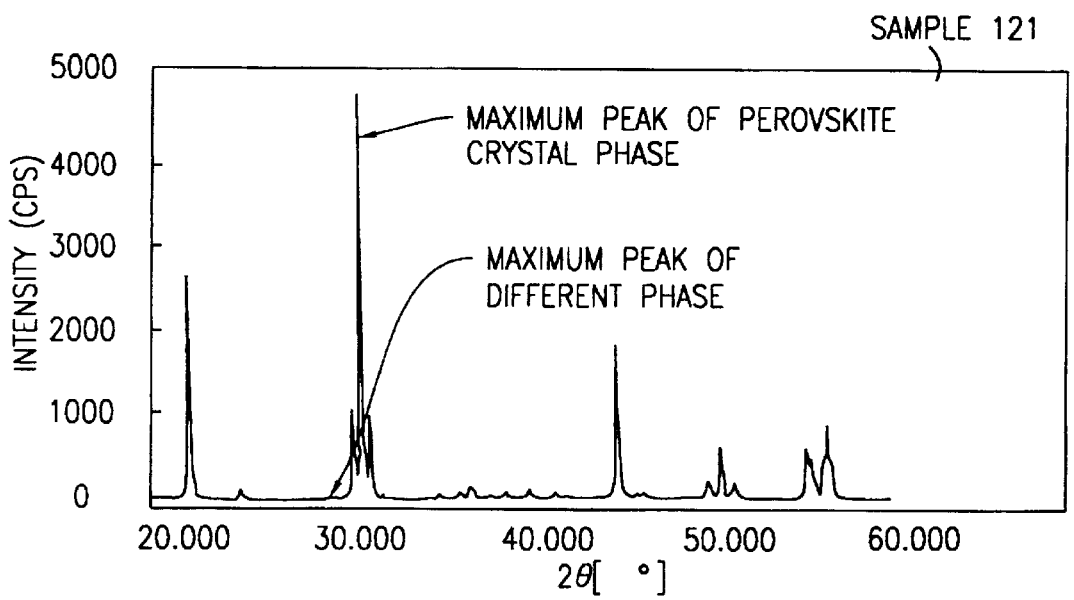
FIG. 4 is a diagram showing the X-ray diffraction pattern of a dielectric ceramic Sample 121.
Figure 5:
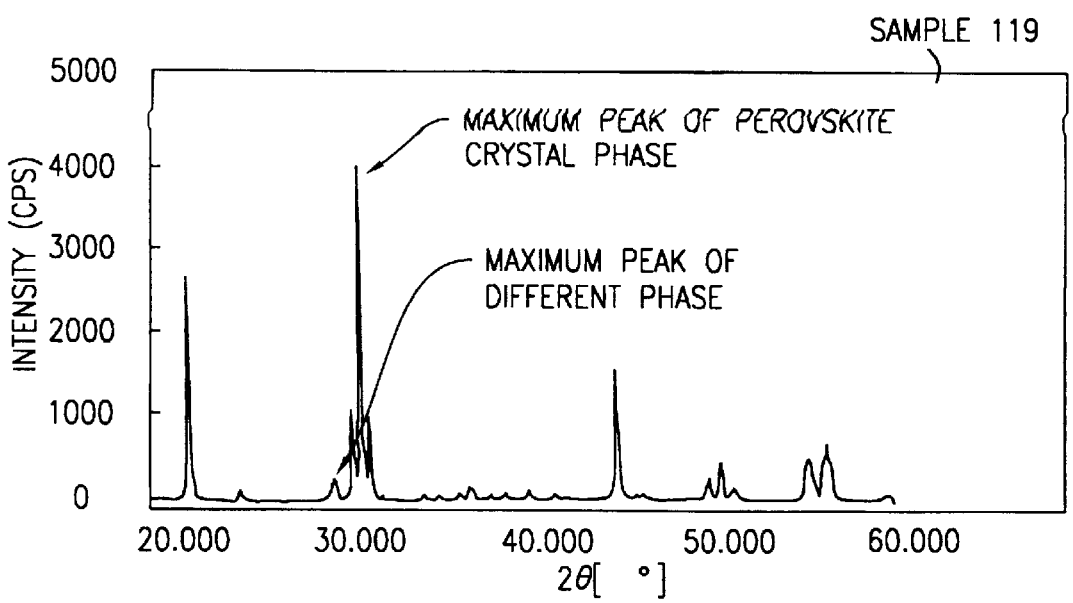
FIG. 5 is a diagram showing the X-ray diffraction pattern of a dielectric ceramic Sample 119.

FIG. 4 is an X-ray diffraction analysis chart of the dielectric ceramic Sample 121 in which the intensity ratio of the maximum peak of the different peak relative to the maximum peak of the perovskite crystal phase is 0.5%. FIG. 5 is an X-ray diffraction analysis chart of the dielectric ceramic Sample 119 having the intensity ratio of 5.5%. The asterisked peaks in the charts are the peaks assigned to the perovskite crystal phase and other peaks are peaks assigned to the different phases.

Figure 6:
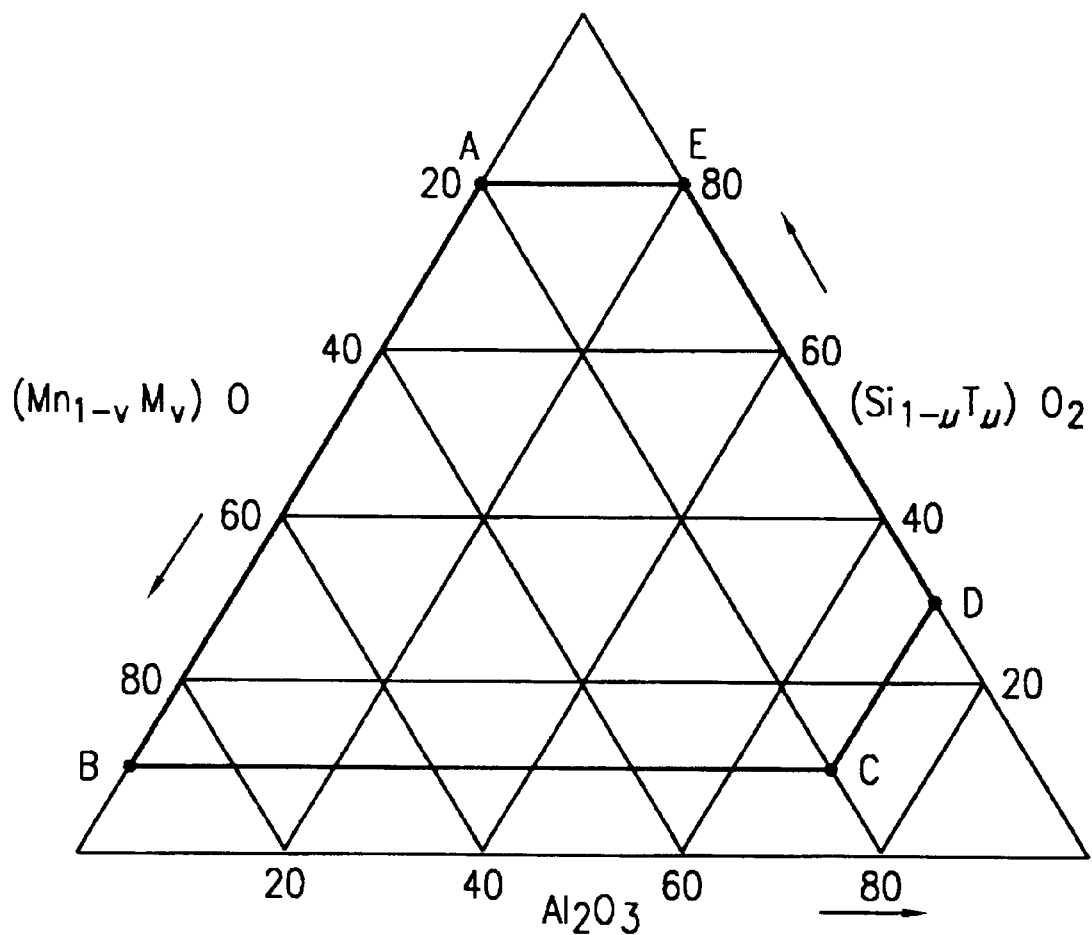
FIG. 6 is a ternary diagram showing the $(Si_{1-\mu}T_\mu)O_2$ content, the $(Mn_{1-\nu}M_\nu)$ content and the $Al_2O_3$ content in a $(Si, T)O_2$—$(Mn, M')O$—$Al_2O_3$-based compound oxide.

Preferably, a compound oxide represented by the formula $\alpha(Si_{1-\mu}T_\mu)O_2$—$\beta(Mn_{1-v}M'_v)O$—$\gamma Al_2O_3$ ($\alpha$, $\beta$, and are molar percent, T is at least one element selected from the group consisting of Ti and Zr, and M' is at least one element selected from the group consisting of Ni, Ba, Sr, Ca and Mg), wherein 0≦μ<0.5 and 0≦v<0.5, and wherein the $(Si_{1-\mu}T_\mu)O_2$ content, the $(Mn_{1-v}M'_v)O$ content, and the $Al_2O_3$ content lie within the region surrounded in the ternary diagram in FIG. 6 by points A (α=80.0, β=20.0, γ=0), B(α=10.0, β=90.0, γ=0), C (α=10.0, β=20.0, γ=70.0), D (α=30.0, β=0, γ=70.0), and E (α=80.0, β=0, γ=20.0), including the lines AE, BC and CD, but excluding the lines AB and ED, is used as the compound oxide. The dielectric ceramics containing such an oxide exhibits a significantly long lifetime of 400 hours or more in the high-temperature loading lifetime test as shown by Samples 121, 122, 124, 125, 127, 129, 131, 133 to 135, 137 to 139, 141 to 143, and 145 to 148 in Tables 10, 11, 14 and 15.

When the raw materials are weighed to make the uncalcined main-component material powder, the value of subscript k in the formula: $(Ca_{1-a-b-c}Sr_aBa_bMg_c)_k(Zr_{1-w-x-y-z}Ti_wMn_xNi_yHf_z)O_3$ is preferably in the range of 0.97≦k≦1.01 and more preferably in the range of 0.98≦k≦1.00. When k is less than 0.97, particle growth of the raw materials are excessively promoted and an average particle diameter after calcining is coarsened. As a consequence, solid phase reaction is inhibited during sintering, the perovskite crystal phase as the primary crystal phase is inhibited from being synthesized and crystal phases not of the perovskite crystal phase are generated. When k exceeds 1.01, formation of the perovskite crystal phase as the primary crystal phase in the calcined material powder is not satisfactory.

The uncalcined main-component material powder is preferably milled to an average diameter of about 0.5 μm or less, more preferably, about 0.3 μm or less, in a ball mill. When an average diameter exceeds 0.5 μm, the solid phase reaction during the calcination is inhibited, the perovskite crystal phase as the primary crystal phase is inhibited from being synthesized and crystal phases not of the perovskite crystal phase are generated. It is to be understood that no limit is imposed as to the lowest value of an average particle diameter.

The material powder is preferably calcined at a temperature in the range of about 1000 to 1300° C. When the calcination temperature is less than about 1000° C., solid phase reaction is inhibited and the perovskite crystal phase as the primary crystal phase is inhibited from being synthesized. Unreacted substances remain and cause the generation of crystal phases not of perovskite crystal phase. When the calcination temperature exceeds about 1300° C., an average particle diameter of the calcined material powder is excessively increased, inhibiting solid phase reaction during the sintering process and preventing the formation of the perovskite crystal phase as the primary crystal phase.

It should be noted that although the thickness of the sintered dielectric ceramic layer is 10 μm in the Examples above, the thickness can be further decreased to 5 μm or less so as to form a smaller high-capacitance monolithic ceramic capacitor. In this case also, fluctuation in particle diameter is prevented and sinterability is improved because of the above-described compound oxide added to the material powder. The resulting capacitor exhibits highly-reliable performance in high-temperature loading test and moisture-resistance loading test and enjoys the same advantages as that according to the Examples.

It should also be noted that in the Examples, the compound oxides are primarily in an amorphous phase and "different phases" refer to all the crystal phases not of the perovskite-structured primary crystal phase, such as these generated by various additives and by reaction between the compound oxide and the main-component.

What is claimed is:

1. A nonreducing dielectric ceramic comprising;
a main-component having a perovskite crystal phase, the main-component satisfying the formula $(Ca_{1-a-b-c}Sr_aBa_bMg_c)_m(Zr_{1-w-x-y-z}Ti_wMn_xNi_yHf_z)O_3$ wherein $0 \leq a < 0.5$, $0 \leq b < 0.5$, $0 \leq c < 0.05$, $0 \leq a+b+c < 0.5$, $0.98 \leq m < 1.03$, $0 \leq w < 0.6$, $0 \leq x < 0.05$, $0 \leq y < 0.05$, $0 \leq z < 0.3$, $0 \leq x+y \leq 0.05$, and $0 \leq w+x+y+z < 0.6$; and
at least one compound oxide selected from the group consisting of (Si, T)$O_2$—MO—XO and (Si, T)$O_2$—(Mn, M')O—$Al_2O_3$, wherein T is at least one of Ti and Zr, MO is at least one of MnO and NiO, XO is at least one member selected from the group consisting of BaO, SrO, CaO and MgO, and M' is at least one member selected from the group consisting of Ni, Ba, Sr, Ca and Mg;
wherein the ratio of the intensity of the maximum peak of the crystal phases other than the perovskite crystal phase to the intensity of the maximum peak assigned to the perovskite crystal phase appearing at 2θ=25 to 35° in a CuKα X-ray diffraction pattern is about 5% or less.

2. A nonreducing dielectric ceramic according to claim 1, wherein the compound oxide is (Si, T)$O_2$—MO—XO and is represented by the formula $\alpha(Si_{1-\mu-\nu}Ti_\mu Zr_\nu)O_2$—$\beta(Mn_{1-\xi}Ni_\xi)O$—$\gamma XO$, wherein α, β, and γ are molar percent, $0 \leq \mu < 0.5$, $0 \leq \nu < 0.7$, $0 \leq \xi \leq 1.0$, $0 \leq \mu+\nu \leq 0.7$; and
wherein the $(Si_{1-\mu-\nu}Ti_\mu Zr_\nu)O_2$ content, the $(Mn_{1-\xi}Ni_\xi)O$ content and the XO content in the compound oxide lie within the region in a ternary diagram surrounded by points A (α=25.0, β=75.0, γ=0), B(α=100.0, β=0, γ=0), C (α=20.0, β=0, γ=80.0), and D (α=5.0, β=15.0, γ=80.0) including the lines AB, AD, and DC, and excluding the line BC.

3. A nonreducing dielectric ceramic according to claim 1, wherein the compound oxide is (Si, T)$O_2$—(Mn, M')O—$Al_2O_3$ and is represented by the formula $\alpha(Si_{1-\mu}T_\mu)O_2$—$\beta(Mn_{1-\nu}M'_\nu)O$—$\gamma Al_2O_3$, wherein α, β, and γ are molar percent, $0 \leq \mu < 0.5$ and $0 \leq \nu < 0.5$; and
wherein the $(Si_{1-\mu}T_\mu)O_2$ content, the $(Mn_{1-\nu}M'_\nu)O$ content and the $Al_2O_3$ content in the compound oxide lie within the region in a ternary diagram surrounded by points A (α=80.0, β=20.0, γ=0), B(α=10.0, β=90.0, γ=0), C (α=10.0, β=20.0, γ=70.0), D (α=30.0, β=0, γ=70.0), and E (α=80.0, β=0, γ=20.0) including the lines AE, BC and CD and excluding the lines AB and ED.

4. A nonreducing dielectric ceramic according to claim 1, wherein said ratio is about 3% or less; and
wherein when the compound oxide is (Si, T)$O_2$—MO—XO, it is represented by the formula $\alpha(Si_{1-\mu-\nu}Ti_\mu Zr_\nu)O_2$—$\beta(Mn_{1-\xi}Ni_\xi)O$—$\gamma XO$, wherein α, β, and γ are molar percent, $0 \leq \mu < 0.5$, $0 \leq \nu < 0.7$, $0 \leq \xi \leq 1.0$, $0 \leq \mu+\nu \leq 0.7$, and the $(Si_{1-\mu-\nu}Ti_\mu Zr_\nu)O_2$ content, the $Mn_{1-\xi}Ni_\xi)O$ content and the XO content in the compound oxide lie within the region in a ternary diagram surrounded by points A (α=25.0, β=75.0, γ=0), B(α=100.0, β=0, γ=0), C (α=20.0, β=0, γ=80.0), and D (α=5.0, β=15.0, γ=80.0) including the lines AB, AD, and DC, and excluding the line BC; and
wherein when the compound oxide is (Si, T)$O_2$—(Mn, M')O—$Al_2O_3$, it is represented by the formula $\alpha(Si_{1-\mu}T_\mu)O_2$—$\beta(Mn_{1-\nu}M'_\nu)O$—$\gamma Al_2O_3$, wherein α, β, and γ are molar percent, $0 \leq \mu < 0.5$ and $0 \leq \nu < 0.5$, and the $(Si_{1-\mu}T_\mu)O_2$ content, the $(Mn_{1-\nu}M'_\nu)O$ content and the $Al_2O_3$ content in the compound oxide lie within the region in a ternary diagram surrounded by points A (α=80.0, β=20.0, γ=0), B(α=10.0, β=90.0, γ=0), C (α=10.0, β=20.0, γ=70.0), D (α=30.0, β=0, γ=70.0), and E (α=80.0, β=0, γ=20.0) including the lines AE, BC and CD and excluding the lines AB and ED.

5. A monolithic ceramic capacitor comprising:
a plurality of dielectric ceramic layers;
a pair of internal electrodes, each of which is between a different pair of the plurality of dielectric ceramic layers; and
a pair of external electrodes, each of which is electrically connected to a different one of the pair of internal electrodes,
wherein each of the plurality of dielectric ceramic layers comprises a nonreducing dielectric ceramic in accordance with of claim 4 and the internal electrodes comprise a base metal.

6. A monolithic ceramic capacitor according to claim 5, further comprising a plating layer on each external electrode.

7. A monolithic ceramic capacitor according to claim 6, wherein the base metal is selected from the group consisting of Ni, a Ni alloy, Cu and a Cu alloy.

8. A monolithic ceramic capacitor according to claim 5, wherein the base metal is selected from the group consisting of Ni, a Ni alloy, Cu and a Cu alloy.

9. A monolithic ceramic capacitor comprising:
a plurality of dielectric ceramic layers;
a pair of internal electrodes, each of which is between a different pair of the plurality of dielectric ceramic layers; and
a pair of external electrodes, each of which is electrically connected to a different one of the pair of internal electrodes,
wherein each of the plurality of dielectric ceramic layers comprises a nonreducing dielectric ceramic in accordance with of claim 3 and the internal electrodes comprise a base metal.

10. A monolithic ceramic capacitor according to claim 9, further comprising a plating layer on each external electrode.

11. A monolithic ceramic capacitor according to claim 10, wherein the base metal is selected from the group consisting of Ni, a Ni alloy, Cu and a Cu alloy.

12. A monolithic ceramic capacitor according to claim 9, wherein the base metal is selected from the group consisting of Ni, a Ni alloy, Cu and a Cu alloy.

13. A monolithic ceramic capacitor comprising:

a plurality of dielectric ceramic layers;

a pair of internal electrodes, each of which is between a different pair of the plurality of dielectric ceramic layers; and a pair of external electrodes, each of which is electrically connected to a different one of the pair of internal electrodes, wherein each of the plurality of dielectric ceramic layers comprises a nonreducing dielectric ceramic in accordance with of claim 2 and the internal electrodes comprise a base metal.

14. A monolithic ceramic capacitor according to claim 13, further comprising a plating layer on each external electrode.

15. A monolithic ceramic capacitor according to claim 14, wherein the base metal is selected from the group consisting of Ni, a Ni alloy, Cu and a Cu alloy.

16. A monolithic ceramic capacitor according to claim 13, wherein the base metal is selected from the group consisting of Ni, a Ni alloy, Cu and a Cu alloy.

17. A monolithic ceramic capacitor comprising:

a plurality of dielectric ceramic layers;

a pair of internal electrodes, each of which is between a different pair of the plurality of dielectric ceramic layers; and a pair of external electrodes, each of which is electrically connected to a different one of the pair of internal electrodes, wherein each of the plurality of dielectric ceramic layers comprises a nonreducing dielectric ceramic in accordance with of claim 1 and the internal electrodes comprise a base metal.

18. A monolithic ceramic capacitor according to claim 17, further comprising a plating layer on each external electrode.

19. A monolithic ceramic capacitor according to claim 18, wherein the base metal is selected from the group consisting of Ni, a Ni alloy, Cu and a Cu alloy.

20. A monolithic ceramic capacitor according to claim 17, wherein the base metal is selected from the group consisting of Ni, a Ni alloy, Cu and a Cu alloy.

* * * * *